US012587719B2

(12) United States Patent
Maze et al.

(10) Patent No.: US 12,587,719 B2
(45) Date of Patent: Mar. 24, 2026

(54) METHOD, DEVICE, AND COMPUTER PROGRAM FOR DYNAMICALLY ENCAPSULATING MEDIA CONTENT DATA

(71) Applicant: CANON KABUSHIKI KAISHA, Tokyo (JP)

(72) Inventors: Frédéric Maze, Langan (FR); Franck Denoual, Saint Domineuc (FR); Jean Le Feuvre, Gometz-le-Chatel (FR)

(73) Assignee: Canon Kabushiki Kaisha, Tokyo (JP)

( * ) Notice: Subject to any disclaimer, the term of this patent is extended or adjusted under 35 U.S.C. 154(b) by 109 days.

(21) Appl. No.: 18/575,222

(22) PCT Filed: Jun. 24, 2022

(86) PCT No.: PCT/EP2022/067359
§ 371 (c)(1),
(2) Date: Dec. 28, 2023

(87) PCT Pub. No.: WO2023/274877
PCT Pub. Date: Jan. 5, 2023

(65) Prior Publication Data
US 2024/0314408 A1     Sep. 19, 2024

(30) Foreign Application Priority Data

Jun. 29, 2021   (GB) ..................................... 2109390
Sep. 28, 2021   (GB) ..................................... 2113874

(51) Int. Cl.
*H04N 21/84*          (2011.01)
*H04N 21/854*         (2011.01)
(52) U.S. Cl.
CPC ....... *H04N 21/84* (2013.01); *H04N 21/85406* (2013.01)

(58) Field of Classification Search
CPC .. H04N 21/84; H04N 21/85406; H04N 19/46; H04N 21/235; H04N 21/236; H04N 21/434; H04N 21/435; H04N 21/845
See application file for complete search history.

(56) References Cited

U.S. PATENT DOCUMENTS

2004/0090466 A1 *   5/2004   Loveria ................... G06G 5/00
2018/0103271 A1 *   4/2018   Wang ..................... H04N 19/66
(Continued)

FOREIGN PATENT DOCUMENTS

WO       2019/002055 A1     1/2019
WO       2021/047820 A1     3/2021

OTHER PUBLICATIONS

Jean Le Feuvre, et al., On corrupted and essential sample groups, International Organisation for Standardisation ISO/IEC JTC1/SC29/WG11, Coding of Moving Pictures and Audio, Jul. 2021, Doc. No. MPEG2021/M57362, Online.
(Continued)

*Primary Examiner* — Anthony Bantamoi
(74) *Attorney, Agent, or Firm* — Canon U.S.A., Inc. IP Division

(57) ABSTRACT

A method for encapsulating media data, the method comprising: identifying, according to a parameter independent from the encapsulation, a portion of the media data or a set of items of information related to a portion of the media data, and encapsulating the portion of media data or the set of items of information as entities in a media file, the entities being grouped into a set of entities associated with a first indication representative of the parameter, wherein the media file comprises a second indication signalling to a client that the set of entities is to be parsed only if the client has knowledge about the first indication.

18 Claims, 8 Drawing Sheets

(56) References Cited

U.S. PATENT DOCUMENTS

| | | |
|---|---|---|
| 2018/0199071 A1 | 7/2018 | Wang |
| 2018/0278964 A1* | 9/2018 | Wang ..................... H04N 19/70 |
| 2021/0168381 A1 | 6/2021 | Ouedraogo |

OTHER PUBLICATIONS

Information Technology—Coding of audio-visual objects—Part 12: ISO Base Media File Format, Technical Corrigendum 1, ISO/IEC FDIS 14496-12:2020(E), Jun. 3, 2016, ISO/IEC JTC 1/SC 29 N.

* cited by examiner

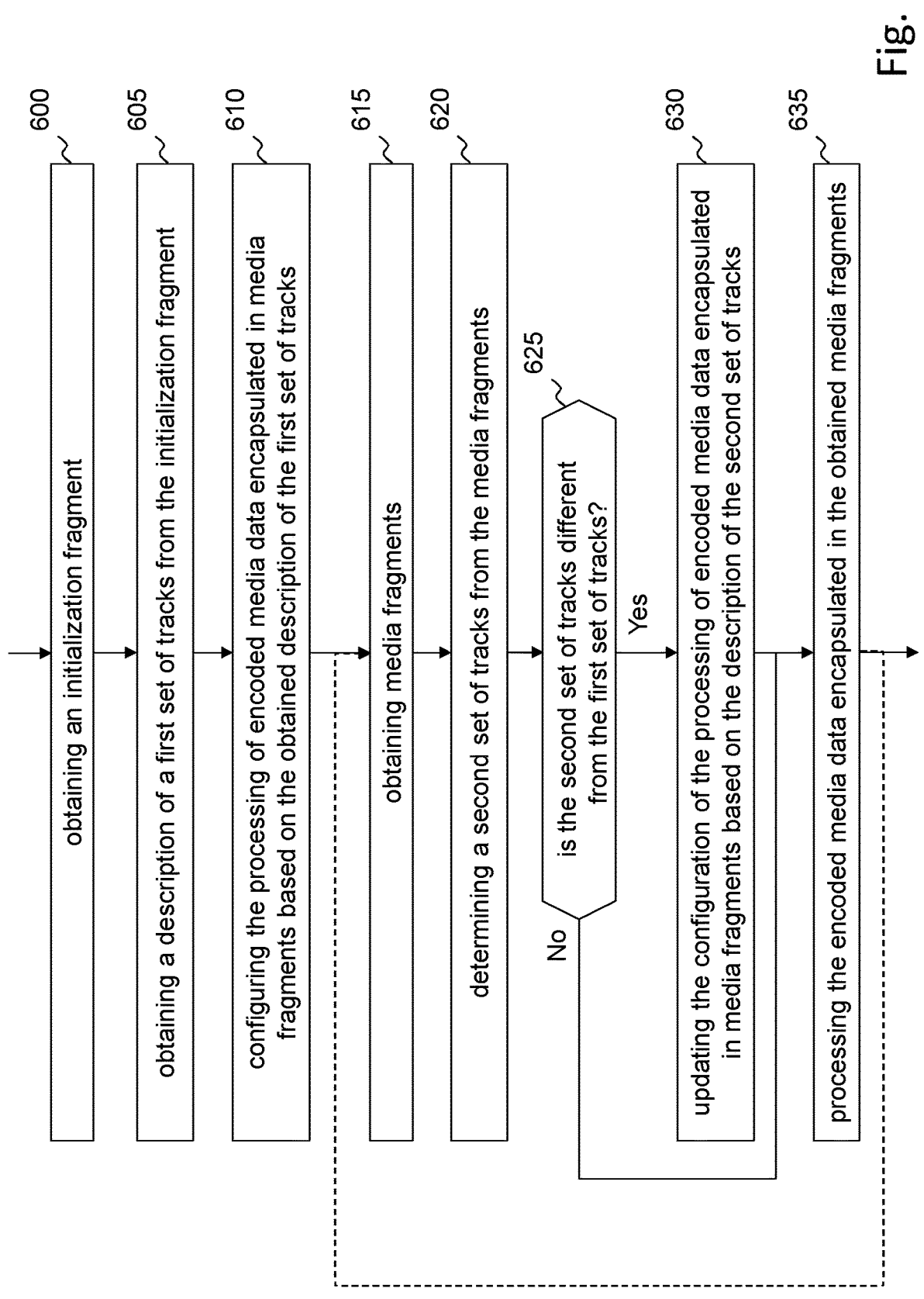

600 obtaining an initialization fragment 605 obtaining a description of a first set of tracks from the initialization fragment 610 configuring the processing of encoded media data encapsulated in media fragments based on the obtained description of the first set of tracks 615 obtaining media fragments 620 determining a second set of tracks from the media fragments 625 is the second set of tracks different from the first set of tracks?

No

Yes 630 updating the configuration of the processing of encoded media data encapsulated in media fragments based on the description of the second set of tracks 635 processing the encoded media data encapsulated in the obtained media fragments

Fig. 6

METHOD, DEVICE, AND COMPUTER PROGRAM FOR DYNAMICALLY ENCAPSULATING MEDIA CONTENT DATA

CROSS REFERENCE TO RELATED APPLICATION

This application is the National Phase application of PCT Application No. PCT/EP2022/067359, filed on Jun. 24, 2022. This application claims the benefit under 35 U.S.C. § 119 (a)-(d) of United Kingdom Patent Application No. 2109390.1, filed on Jun. 29, 2021 and entitled "METHOD, DEVICE, AND COMPUTER PROGRAM FOR DYNAMICALLY ENCAPSULATING MEDIA CONTENT DATA", and of United Kingdom Patent Application No. 2113874.8, filed on Sep. 28, 2021 and entitled "METHOD, DEVICE, AND COMPUTER PROGRAM FOR DYNAMICALLY ENCAPSULATING MEDIA CONTENT DATA". The above cited patent applications are incorporated herein by reference in its entirety.

FIELD OF THE INVENTION

The present invention relates to a method, a device, and a computer program for improving encapsulating and parsing of media data, making it possible to improve the handling of varying configuration and organization of encapsulated media data.

BACKGROUND OF THE INVENTION

The International Standard Organization Base Media File Format (ISO BMFF, ISO/IEC 14496-12) is a well-known flexible and extensible format that describes encoded timed or non-timed media data or bit-streams either for local storage or for transmission via a network or via another bit-stream delivery mechanism. This file format has several extensions, e.g. Part-15, ISO/IEC 14496-15 that describes encapsulation tools for various NAL (Network Abstraction Layer) unit-based video encoding formats. Examples of such encoding formats are AVC (Advanced Video Coding), SVC (Scalable Video Coding), HEVC (High Efficiency Video Coding), L-HEVC (Layered HEVC), and VVC (Versatile Video Coding). Another example of file format extension is ISO/IEC 23008-12 that describes encapsulation tools for still images or for sequence of still images such as HEVC Still Image. Still another example of file format extension is ISO/IEC 23090-2 that defines the omnidirectional media application format (OMAF). Still other examples of file format extension are ISO/IEC 23090-10 and ISO/IEC 23090-18 that define the carriage of Visual Volumetric Video-based Coding (V3C) media data and Geometry-based Point Cloud Compression (G-PCC) media data.

This file format is object-oriented. It is composed of building blocks called boxes (or data structures, each of which being identified by a four characters code, also denoted FourCC or 4CC). Full boxes are data structures similar to boxes, further comprising a version and flag value attributes. In the following, the term box may designate both full boxes or boxes. These boxes or full boxes are sequentially or hierarchically organized. They define parameters describing the encoded timed or non-timed media data or bit-stream, their structure and the associated timing, if any. In the following, it is considered that encapsulated media data designate encapsulated data comprising metadata and media data (the latter designating the bit-stream that is encapsulated). All data in an encapsulated media file (media data and metadata describing the media data) is contained in boxes. There is no other data within the file. File-level boxes are boxes that are not contained in other boxes.

According to the file format, the overall presentation (or session) over the time is called a movie. The movie is described within a movie box (identified with the four characters code 'moov') at the top level of the media or presentation file. This movie box represents an initialization information container containing a set of various boxes describing the presentation. It may be logically divided into tracks represented by track boxes (identified with the four characters code 'trak'). Each track (uniquely identified by a track identifier (track_ID)) represents a timed sequence of media data pertaining to the presentation (for example a sequence of video frames or of subparts of video frames). Within each track, each timed unit of media data is called a sample. Such a timed unit may be a video frame or a subpart of a video frame, a sample of audio, or a set of timed metadata. Samples are implicitly numbered in an increasing decoding order. Each track box contains a hierarchy of boxes describing the samples of the corresponding track. Among this hierarchy of boxes, a sample table box (identified with the four characters code 'stbl') contains all the items of time information and data indexing of the media samples in a track. In addition, the 'stbl' box contains, in particular, a sample description box (identified with the four characters code 'stsd') containing a set of sample entries, each sample entry giving required information about the coding configuration (including a coding type identifying the coding format and various coding parameters characterizing the coding format) of media data in a sample, and any initialization information needed for decoding the sample. The actual sample data are stored in boxes called media data boxes (identified with the four characters code 'mdat') or called identified media data boxes (identified with the four characters code 'imda', similar to the media data box but containing an additional identifier). The media data boxes and the identified media data boxes are located at the same level as the movie box.

The movie may also be fragmented, i.e. organized temporally as a movie box containing information for the whole presentation followed by a list of movie fragments, i.e., a list of couples comprising a movie fragment box (identified with the four-character code 'moof') and a media data box ('mdat') or a list of couples comprising a movie fragment box ('moof') and an identified media data box ('imda').

FIG. 1 illustrates an example of encapsulated media data temporally organized as a fragmented presentation in one or more media files according to the ISO Base Media File Format.

The media data encapsulated in the one or more media files 100 starts with a FileTypeBox ('ftyp') box (not illustrated) providing a set of brands identifying the precise specifications to which the encapsulated media data conforms, that are used by a reader to determine whether it can process the encapsulated media data. The 'ftyp' box is followed by a MovieBox ('moov') box referenced 105. The MovieBox box provides initialization information that is needed for a reader to initiate processing of the encapsulated media data. In particular, it provides a description of the presentation content, the number of tracks, and information regarding their respective timelines and characteristics. For the sake of illustration, the MovieBox box may indicate that the presentation comprises one track having an identifier track_ID equal to 1.

As illustrated, MovieBox box 105 is followed by one or more movie fragments (also called media fragments), each movie fragment comprising metadata stored in a MovieFragmentBox ('moof') box and media data stored in a MediaDataBox ('mdat') box. For the sake of illustration, the one or more media files 100 comprises a first movie fragment containing and describing samples 1 to N of a track identified with track_ID equal to 1. This first movie fragment is composed of 'moof' box 110 and of 'mdat' box 115. Still for the sake of illustration, the one or more media files 100 comprises a second movie fragment containing and describing samples N+1 to N+M of the track identified with track_ID equal to 1. This second movie fragment is composed of 'moof' box 120 and of 'mdat' box 125.

When the encapsulated media data is fragmented into a plurality of files, the FileTypeBox and MovieBox boxes (also denoted initialization fragment in the following) are contained within an initial media file (also denoted an initialization segment), in which the track(s) contain no samples. Subsequent media files (also denoted media segments) contain one or more movie fragments.

Among other information, 'moov' box 105 may contain a MovieExtendsBox ('mvex') box 130. When present, information contained in this box warns readers that there might be subsequent movie fragments and that these movie fragments must be found and scanned in the given order to obtain all the samples of a track. To that end, information contained in this box should be combined with other information of the MovieBox box. MovieExtendsBox box 130 may contains an optional MovieExtendsHeaderBox ('mehd') box and one TrackExtendsBox ('trex') box per track defined in MovieBox box 105. When present, the MovieExtendsHeaderBox box provides the overall duration of a fragmented movie. Each TrackExtendsBox box defines default parameter values used by the associated track in the movie fragments.

As illustrated, 'moov' box 105 also contains one or more TrackBox ('trak') boxes 135 describing each track in the presentation. TrackBox box 135 contains in its box hierarchy a SampleTableBox ('stbl') box that in turn contains descriptive and timing information of the media samples of the track. In particular, it contains a SampleDescriptionBox ('stsd') box containing one or more SampleEntry boxes giving descriptive information about the coding format of the samples (the coding format being identified with a 4CC, as illustrated with 'xxxx' characters), and initialization information needed for configuring a decoder according to the coding format.

For instance, a SampleEntry box having a Four-character type sets to 'vvc1' or 'vvi1' signals that the associated samples contain media data encoded according to the Versatile Video Coding (VVC) format and a SampleEntry box having a Four-character type sets to 'hvc1' or 'hev1' signals that the associated samples contain media data encoded according to the High Efficiency Video Coding (HEVC) format. The SampleEntry box may contain other boxes containing information that applies to all samples associated with this SampleEntry box.

Samples are associated with a SampleEntry box via the sample_description_index parameter either in a SampleToChunkBox ('stsc') box in the SampleTableBox ('stbl') box when the media file is a non-fragmented media file, or otherwise in a TrackFragmentHeaderBox('tfhd') box in a TrackFragmentBox ('traf') box of the MovieFragmentBox ('moof') box or in a TrackExtendsBox ('trex') box in a MovieExtendsBox ('mvex') box when the media file is fragmented.

According to ISO Base Media File Format, all tracks and all sample entries in a presentation are defined in 'moov' box 105 and cannot be declared later on during the presentation.

It is observed that a movie fragment may contain samples for one or more of the tracks declared in the 'moov' box, but not necessarily for all of the tracks. The MovieFragmentBox box 110 or 120 contains a TrackFragmentBox ('traf') box including a TrackFragmentHeaderBox ('tfhd') box (not represented) providing an identifier (e.g. Track_ID=1) identifying each track for which samples are contained in the 'mdat' box 115 or 125 of the movie fragment. Among other information, the 'traf' box contains one or more TrackRunBox ('trun') boxes documenting a contiguous set of samples for a track in the movie fragment.

An ISOBMFF file or segment may contain multiple set of encoded timed media data (also denoted bit-streams or streams) or sub-parts of sets of encoded timed media data (also denoted sub-bit-streams or sub-streams) forming multiple tracks. When the sub-parts correspond to one or successive spatial parts of a video source, taken over the time (e.g. at least one rectangular region, also known as 'tile' or 'sub-picture', taken over the time), the corresponding multiple tracks may be called tile tracks or sub-picture tracks.

It is also noted that ISOBMFF and its extensions comprise several grouping mechanisms to group together tracks, static items, or samples and to associate a group description with a group. A group typically shares common semantic and/or characteristics. For example, MovieBox box 105 and/or MovieFragmentBox boxes 110 and 120 may contain sample groups associating properties to group of samples for a track. The sample groups characterized by a grouping type may be defined by two linked boxes, a SampleToGroupBox ('sbgp') box that represents the assignment of samples to sample groups and a SampleGroupDescriptionBox ('sgpd') box that contains a sample group entry for each sample group describing the properties of the group.

While these ISOBMFF file formats have proven to be efficient, there are several limitations with regards to dynamic session support for fragmented ISOBMFF files. Accordingly, there is a need for signalling some functionalities of the encapsulation mechanisms that should be understood by a reader to parse and to decode the encapsulated media data, to help the reader selecting the data to be processed.

An example comes from the core definition of the presentation that can be only defined in the initial movie box and cannot be updated later on during the presentation. Another example is concerning improving the signalling of dynamic session support.

Accordingly, there is a need for signalling some functionalities of the encapsulation mechanisms that should be understood by a reader to parse and to decode the encapsulated media data, to help the reader selecting the data to be processed.

SUMMARY OF THE INVENTION

The present invention has been devised to address one or more of the foregoing concerns.

According to a first aspect of the invention, there is provided a method for encapsulating media data, the encapsulated media data comprising a metadata portion associated with the media data and media fragments, the method being carried out by a server and comprising:

> obtaining a first portion of the media data, the first portion being organized into a first set of one or more media data tracks, encapsulating metadata describing the one or more tracks of the first set of one or more tracks in the metadata portion and encapsulating the first portion of the media data into one or more media fragments, obtaining a second portion of the media data, the obtained second portion being organized into a second set of one or more media data tracks, if at least one track of the second set of one or more tracks is different from the one or more tracks of the first set, encapsulating the second portion of media data and the metadata describing the at least one track of the second set of one or more tracks into one media fragment.

Accordingly, the method of the invention makes it possible to encapsulate dynamically media data, without requiring a full description of the media data before starting their encapsulation.

According to some embodiments, the method further comprises obtaining a third portion of the media data, the obtained third portion being organized into a third set of one or more media data tracks, and if the at least one track of the second set of one or more tracks belongs to the third set of one or more media data tracks, encapsulating the third portion of media data and the metadata describing the at least one track of the second set of one or more tracks into one media fragment.

According to some embodiments, encapsulating the third portion of media data and the metadata describing the at least one track of the second set of one or more tracks into one media fragment comprises copying the metadata describing the at least one track of the second set of one or more tracks from the media fragment encapsulating the second portion to the media fragment encapsulating the third portion.

According to some embodiments, the metadata portion comprises an indication signaling that a media fragment may comprise a track different from the one or more tracks of the first set of tracks.

According to some embodiments, metadata of the media fragment encapsulating the second portion of media data comprise an indication signaling that the media fragment encapsulating the second portion of media data comprises a track different from the one or more tracks of the first set of tracks.

According to some embodiments, media data of the first portion are coded according to at least one first coding configuration defined in a set of one or more first sample entries, the method further comprising encapsulating metadata describing the one or more first sample entries in the metadata portion, obtaining a fourth portion of the media data, media data of the fourth portion being coded according to at least one second coding configuration, and if the at least one second coding configuration is different from the coding configurations defined in the set of one or more first sample entries, encapsulating into one media fragment the fourth portion of media data and the metadata describing at least one second sample entry defining the at least one second coding configuration.

According to some embodiments, the fourth portion corresponds to the second portion.

According to some embodiments, the metadata portion comprises an indication signaling that a media fragment may comprise a sample entry different from the sample entry in the set of one or more first sample entries or metadata of the media fragment encapsulating the fourth portion of media data comprises an indication signaling that metadata of the media fragment encapsulating the fourth portion of media data comprise a sample entry different from the sample entry in the set of one or more first sample entries.

According to some embodiments, the at least one track of the second set of one or more tracks comprises references to at least one other track, the at least one other track being described in the metadata portion or in metadata of a media fragment.

According to a second aspect of the invention, there is provided a method for parsing encapsulated media data, the encapsulated media data comprising a metadata portion associated with the media data and media fragments, the method being carried out by a client and comprising:

obtaining, from the metadata portion, metadata describing one or more tracks of a first set of one or more tracks, obtaining a media fragment referred to as the first media fragment, parsing the first media fragment to obtain metadata, and if the metadata obtained from the first media fragment describe at least one track different from the one or more tracks of the first set, parsing the first media fragment to obtain a portion of the media data, the portion of media data being organized into a second set of one or more media data tracks comprising the at least one track.

Accordingly, the method of the invention makes it possible to parse encapsulated media data that have been encapsulated dynamically, without requiring a full description of the media data before starting their encapsulation.

According to some embodiments, the method further comprises obtaining a second media fragment, parsing the second media fragment to obtain metadata, if the metadata of the second media fragment comprise the same description of the at least one track different from the one or more tracks of the first set as the metadata of the first media fragment, parsing the second media fragment to obtain a portion of the media data, media data obtained from the first portion of media data and from the second portion of media data belonging to the same at least one track.

According to some embodiments, the method further comprises obtaining from the metadata portion an indication signaling that a media fragment may comprise a track different from the one or more tracks of the first set of tracks.

According to some embodiments, the method further comprises obtaining from metadata of an obtained media fragment an indication signaling that the media fragment comprising the indication comprises a track different from the one or more tracks of the first set of tracks.

According to some embodiments, the method further comprises obtaining a third media fragment, parsing the third media fragment to obtain metadata, and if the metadata of the third media fragment comprise metadata describing at least one sample entry defining at least one coding configuration, parsing at least a portion of media data of the third media fragment according to the at least one coding configuration to obtain media data.

According to some embodiments, the third portion corresponds to the first portion.

According to some embodiments, the method further comprises obtaining from the metadata portion an indication signaling that a media fragment may describe a sample entry different from sample entries described in the metadata portion or obtaining from metadata of an obtained media fragment an indication signaling that the media fragment comprising the indication describe a sample entry different from sample entries described in the metadata portion.

According to a third aspect of the invention, there is provided a method for encapsulating media data, the method being carried out by a server and comprising identifying, according to a parameter independent from the encapsulation, a portion of the media data or a set of items of information related to a portion of the media data, and encapsulating the portion of media data or the set of items of information as entities in a media file, the entities being grouped into a set of entities associated with a first indication representative of the parameter, wherein the media file comprises a second indication signalling to a client that the set of entities is to be parsed only if the client has knowledge about the first indication.

Accordingly, the method of the invention makes it possible to signal some functionalities of the encapsulation mechanisms that should be understood by a reader to parse and to decode the encapsulated media data, to help the reader selecting the data to be processed.

According to a fourth aspect of the invention, there is provided a method for parsing encapsulated media data, the method being carried out by a client and comprising determining that the encapsulated media data comprises a second indication signalling that a set of entities is to be parsed only if the client has knowledge about a first indication associated with the set of entities to be parsed, obtaining a reference of a set of entities to be parsed, obtaining a first indication associated with the set of entities of which the reference has been obtained, and if the client has no knowledge about the obtained first indication associated with the set of entities of which the reference has been obtained, ignoring the set of entities of which the reference has been obtained when parsing the encapsulated media data.

Accordingly, the method of the invention makes it possible for a reader to understand some functionalities of the encapsulation mechanisms used to generate the encapsulated media data, for parsing and decoding the encapsulated media data, and to select the data to be processed.

According to some embodiments, the second indication further signals that the media data can be rendered only if the client has knowledge about the first indication.

According to some embodiments, the entities are samples or supplemental information descriptive of the media data. The set of samples may be, for example, sample groups, entity group, tracks, sample entries, etc.

According to some embodiments, the entities are samples and the set of entities is a set of corrupted samples.

According to other aspects of the invention, there is provided a processing device comprising a processing unit configured for carrying out each step of the methods described above. The other aspects of the present disclosure have optional features and advantages similar to the first, second, third, and fourth above-mentioned aspects.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 6 is a block diagram illustrating an example of steps carried out by a client or reader to process encapsulated media data according to some embodiments of the invention;

DETAILED DESCRIPTION OF THE INVENTION

According to some embodiments of the invention, tracks and/or sample entries can be dynamically signalled within a movie fragment without being previously described within an initialization fragment.

Figure 1:
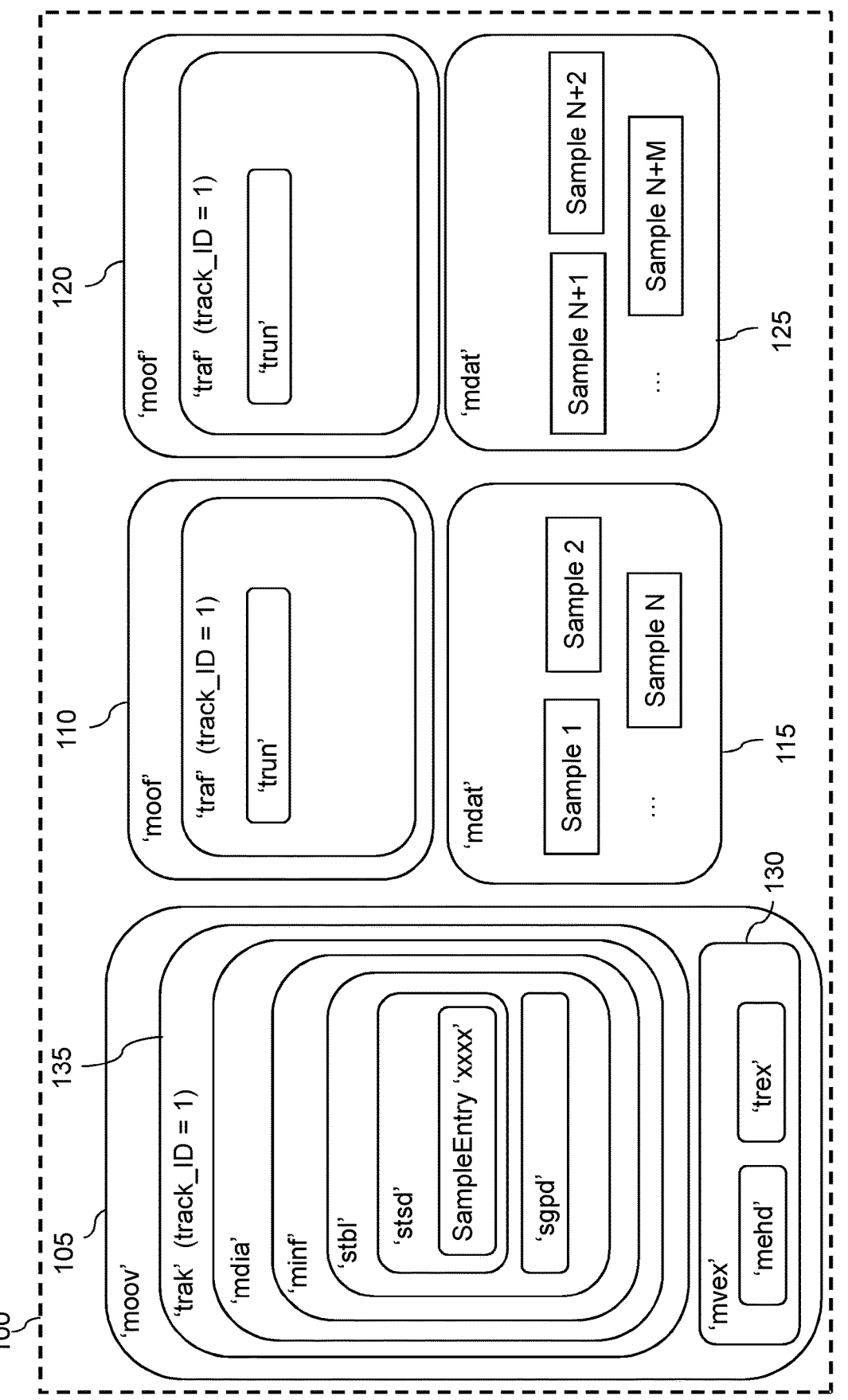
FIG. 1 illustrates an example of a structure of fragmented media data that are encapsulated according to the ISO Base Media File Format.
Figure 2:
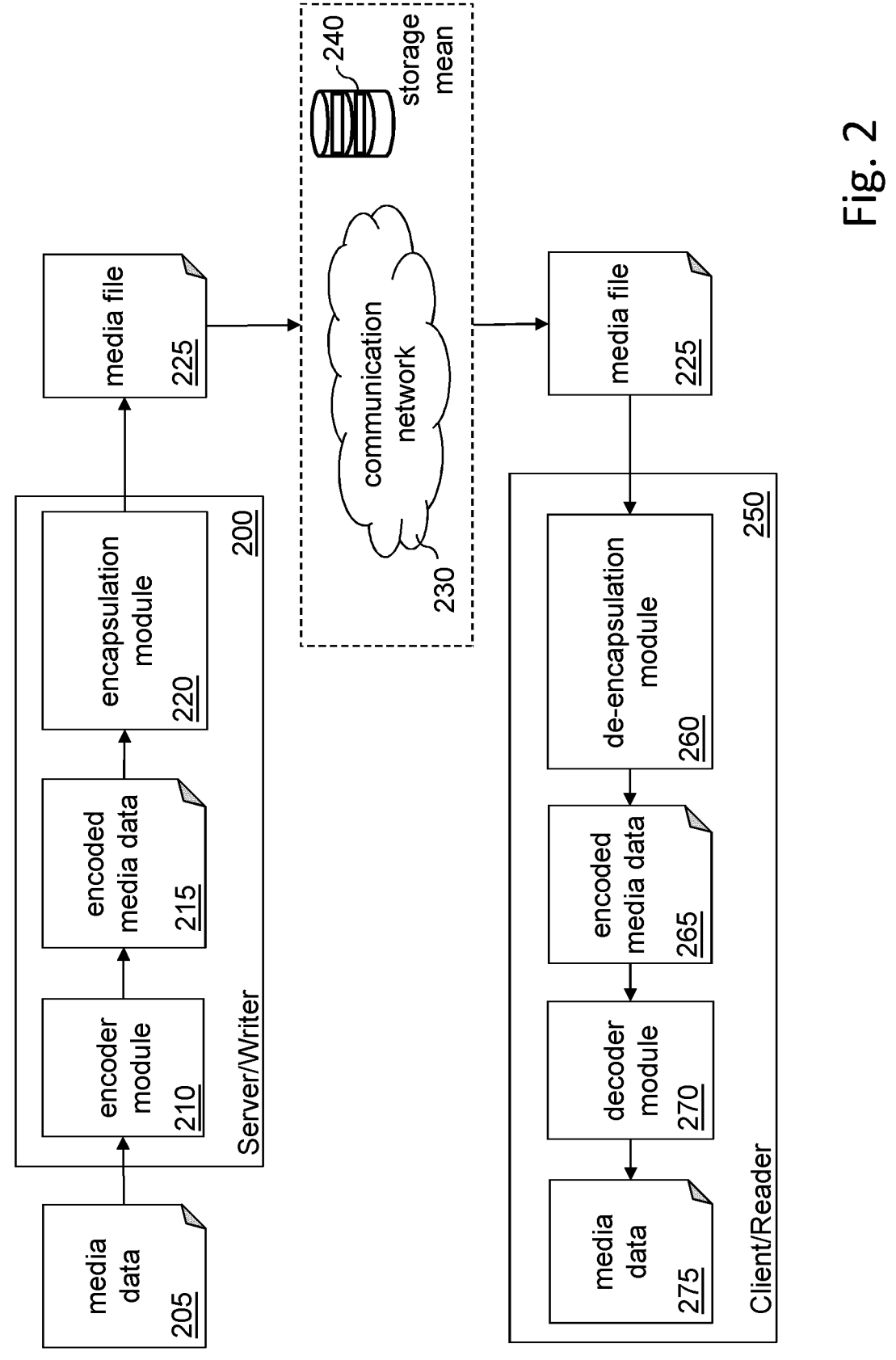
FIG. 2 illustrates an example of a system wherein some embodiments of the invention may be carried out.

FIG. 2 illustrates an example of a system wherein some embodiments of the invention may be carried out.

As illustrated, a server or writer referenced 200 is connected, via a network interface (not represented), to a communication network 230 to which is also connected, via a network interface (not represented), to a client or reader 250, making it possible for server or writer 200 and client or reader 250 to exchange a media file referenced 225 via communication network 230.

According to other embodiments, server or writer 200 may exchange media file 225 with client or reader 250 via storage means, for example the storage means referenced 240. Such storage means can be for example a memory module (e.g. Random Access Memory (RAM)), a hard disk, a solid-state drive, or any removable digital medium for example such as a disk or memory card.

According to the illustrated example, server or writer 200 aims at processing media data, for example the media data referenced 205, e.g. video data, audio data, and/or descriptive metadata, for streaming or for storage purposes. To that end, server or writer 200 obtains or receives a media content comprising original media data or bit-streams 205, e.g. one or more timed sequences of images, timed sequences of audio sample, or timed sequences of descriptive metadata, and encodes the obtained media data using an encoder module referenced 210 (e.g. video encoder or audio encoder) into the encoded media data referenced 215. Next, server or writer 200 encapsulates the encoded media data into the one or more media files referenced 225, containing the encapsulated media data, using the encapsulation module referenced 220. According to the illustrated example, server or writer 200 comprises at least one encapsulation module 220 to encapsulate the encoded media data. Encoder module 210 may be implemented within server or writer 200 to encode the received media data, or it may be separate from server or writer 200. Encoder module 210 is optional, since server or writer 200 may encapsulate media data previously encoded in a different device or may encapsulate raw media data.

Encapsulation module 220 may generate one media file or a plurality of media files. This media file or plurality of media files correspond to encapsulated media data containing the encapsulation of alternative versions of the media data and/or successive fragments of the encapsulated media data.

Still according to the illustrated embodiment, client or reader 250 is used for processing encapsulated media data for displaying or outputting the media data to a user.

As illustrated, client or reader 250 obtains or receives one or more media files, such as media file 225, via communication network 230 or from storage mean 240. Upon obtaining or receiving the media file, client or reader 250 parses and de-encapsulates the media file to retrieve the encoded media data referenced 265 using a de-encapsulation module referenced 260. Next, client or reader 250 decodes the encoded media data 265 with the decoder module referenced 270 to obtain the media data referenced 275 representing an audio and/or video content (signal) that can be processed by client or reader 250 (e.g. rendered or displayed to a user by dedicated modules not represented). It is noted that decoder module 270 may be implemented within client or reader 250 to decode the encoded media data, or it may be separate from client or reader 250. Decoder module 270 is optional since client or reader 250 may receive a media file corresponding to encapsulated raw media data.

It is noted here that the media file or the plurality of media files, for example media file 225, may be communicated to de-encapsulation module 260 of client or reader 250 in a number of ways. For example, it may be generated in advance by encapsulation module 220 of server or writer 200 and stored as data in a remote storage apparatus in communication network 230 (e.g. on a server or a cloud storage) or a local storage apparatus such as storage means 240 until a user requests a media file encoded therein from the remote or local storage apparatus. Upon requesting a media file, the data is read, communicated, or streamed to de-encapsulation module 260 from the storage apparatus.

Server or writer 200 may also comprise a content providing apparatus for providing or streaming, to a user, content information directed to media files stored in the storage apparatus (e.g. content information may be described via a manifest file (e.g. a Media Presentation Description (MPD) compliant with the ISO/IEC MPEG-DASH standard, or a HTTP Live Streaming (HLS) manifest) including for example the title of the content and other descriptive metadata and storage location data for identifying, selecting, and requesting the media files). The content providing apparatus may also be adapted for receiving and processing a user request for a media file to be delivered or streamed from the storage apparatus to client or reader 250. Alternatively, server or writer 200 may generate the media file or the plurality of media files using encapsulation module 220 and communicates or streams it directly to client or reader 250 and/or to de-encapsulation module 260 as and when the user requests the content.

The user has access to the audio/video media data (signal) through a user interface of a user terminal comprising client or reader 250 or a user terminal that has means to communicate with client or reader 250. Such a user terminal may be a computer, a mobile phone, a tablet or any other type of device capable of providing/displaying the media data to the user.

For the sake of illustration, the media file or the plurality of media files such as media file 225 represent encapsulated encoded media data (e.g. one or more timed sequences of encoded audio or video data) into boxes according to ISO Base Media File Format (ISOBMFF, ISO/IEC 14496-12 and ISO/IEC 14496-15 standards). The media file or the plurality of media files may correspond to one single media file (prefixed by a FileTypeBox 'ftyp' box) or to one initialization segment file (prefixed by a FileTypeBox 'ftyp' box) followed by one or more media segment files (possibly prefixed by a SegmentTypeBox 'styp' box). According to ISOBMFF, the media file (and segment files when present) may include two kinds of boxes: "media data" boxes ('mdat' or 'imda') containing the encoded media data and "metadata boxes" ('moov' or 'moof' or 'meta' box hierarchy) containing the metadata defining placement and timing of the encoded media data.

Encoder or decoder modules (referenced respectively 210 and 270 in FIG. 2) encodes and decodes image or video content using an image or video standard. For instance, Image or Video coding/decoding (codecs) standards include ITU-T H.261, ISO/IEC MPEG-1 Visual, ITU-T H.262 (ISO/IEC MPEG-2 Visual), ITU-T H.263 (ISO/IEC MPEG-4 Visual), ITU-T H.264 (ISO/IEC MPEG-4 AVC), including its scalable video coding (SVC) and multi-view video coding (MVC) extensions, ITU-T H.265 (HEVC), including its scalable (SHVC) and multi-view (MV-HEVC) extensions or ITU-T H.VVC (ISO/IEC MPEG-I Versatile Video Coding (VVC)). The techniques and systems described herein may also be applicable to other coding standards already available or not yet available or developed.

Figure 3:
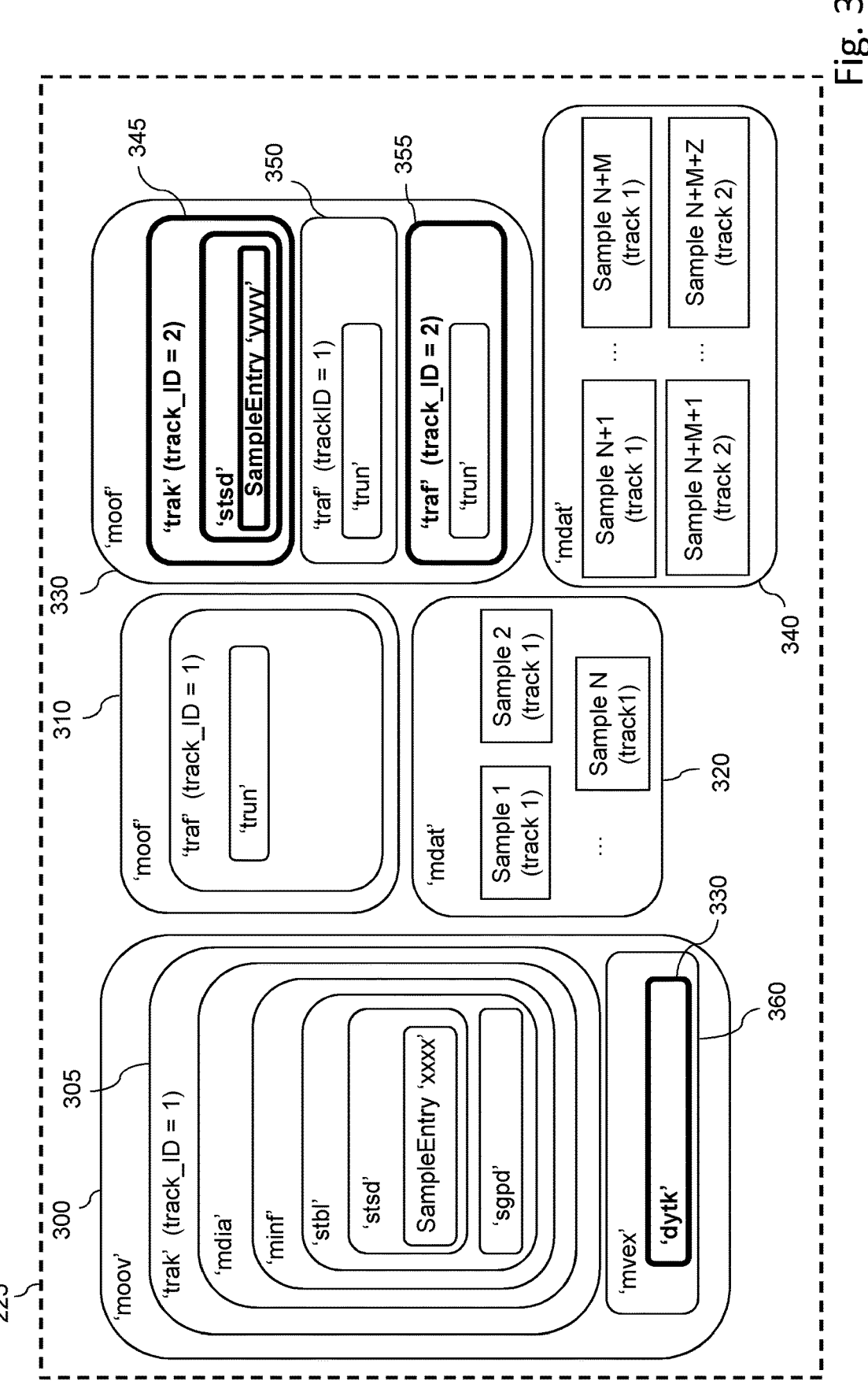
FIG. 3 illustrates an example of a fragmented presentation encapsulated within one or more media files, wherein a new track is defined in a movie fragment according to some embodiments of the invention.

FIG. 3 illustrates an example of a fragmented presentation encapsulated within one or more media files, wherein a new track is defined in a movie fragment according to some embodiments of the invention.

According to a particular embodiment, the ISOBMFF is extended to allow defining a new track in a movie fragment (also called a media fragment), the new track being not previously defined in an initialization fragment, for example in MovieBox ('moov') box 300. Such a new track may be called a "dynamic track", i.e. a track appearing along the presentation and that was not present at the beginning of the presentation (e.g., not declared in the MovieBox box). A dynamic track may have a duration of one movie fragment or may span over several movie fragments. In opposition to dynamic tracks, the tracks declared in the MovieBox box may be called "static tracks".

MovieBox box 300 provides a description of a presentation that is initially composed of at least one track defined by one TrackBox ('trak') box 305 with track identifiers, for example a track identifier track_ID equal to 1, TrackBox box 305 indicating a sequence of samples having a coding format described by the sample entry illustrated with the 4CC 'xxxx'.

According to the illustrated example, MovieBox box 300 is followed by two movie fragments (or media fragments). The first movie fragment is composed of the MovieFragmentBox ('moof') box referenced 310, containing metadata, and of the MediaDataBox ('mdat') box 320, containing media data (or encoded media data). More precisely, as illustrated, this first movie fragment contains N samples (samples 1 to N) stored in 'mdat' box 320, that belong to the track fragment described within a TrackFragmentBox ('traf') box having a track identifier track_ID equal to 1 in the MovieFragmentBox ('moof') box referenced 310. Samples 1 to N are associated with the sample entry illustrated by the 4CC 'xxxx' via the parameter denoted sample_description_index in the TrackFragmentHeaderBox ('tfhd') box or by default via the parameter denoted default_sample_description_index in a TrackExtendsBox ('trex') box.

As illustrated, a new track or dynamic track (having a track identifier track_ID equal to 2) is declared in the second movie fragment, in its MovieFragmentBox ('moof') box referenced 330. This new track or dynamic track is not defined in MovieBox box 300 (i.e. in the initialization fragment). According to the example, the second movie fragment contains samples for two tracks in MediaDataBox ('mdat') 340: samples N+1 to N+M belonging to the track having a track identifier track_ID equal to 1, that are associated with the sample entry 'xxxx' via the parameter denoted sample_description_index in the TrackFragmentHeaderBox ('tfhd') box having the track identifier equal to 1 or by default via the parameter denoted default_sample_description_index in a TrackExtendsBox ('trex') box having the track identifier equal to 1, and samples N+M+1 to N+M+Z belonging to the new track having a track identifier track equal to 2, that are associated with the sample entry 'yyyy' via the parameter denoted sample_description_index in the TrackFragmentHeaderBox ('tfhd') box with track_ID equal to 2.

The new track or dynamic track in the second movie fragment is declared by defining a TrackBox ('trak') box in 'moof' box 330, here the 'trak' box 345.

New tracks or dynamic tracks may be defined in any movie fragment in the presentation using the same mechanism.

According to some embodiments, the definition of the 'trak' box is modified to authorize its definition in a MovieFragmentBox ('moof') box as follows:

---

Box Type: 'trak'
Container: MovieBox or MovieFragmentBox
Mandatory: Yes
Quantity: One or more

---

When a TrackBox ('trak') box is present in a MovieFragmentBox ('moof') box, it is preferably located before any TrackFragmentBox ('traf') box, for example before 'traf' boxes 350 and 355. The track defined in this case is only valid for the lifetime of the movie fragment. The tracks defined in such a way should use a track identifier (track_ID) that is different from the one of any tracks defined in the MovieBox box (i.e. in the initialization fragment or segment), but may have the same track identifier (track_ID) than the one of tracks defined in a previous movie fragment to identify a continuation of the same track. In such a case, the corresponding TrackBox boxes are identical (bit to bit). To span over multiple fragments, multiple declarations of the new tracks, or dynamic tracks, are required from one fragment to another, in order to guarantee random access on each track fragment. The continuity of one or more new tracks or dynamic tracks may concern some movie fragments corresponding to a period of time, but not necessarily all movie fragments covering this period of time. In a variant, to determine the continuity of a new track or dynamic track over two movie fragments (not necessarily consecutive), a parser or reader can simply compare the TrackBox payloads: if they are equal (bit to bit), the parser or reader can safely consider it is the same track and may avoid some decoder reinitialization. If they are not equal (even if the same track identifier is used), the parser or reader should consider that it is a different track than the previous one. Preferably, it may be recommended to allocate different track identifiers to new tracks or dynamic tracks in the case where there is no continuity between these tracks over different movie fragments. More generally, the track identifier of a new track or dynamic track should not conflict with any other track identifier within the MovieBox box (to that end, the writer may use the next track identifier value). When the file is encapsulated using the 'unif' brand, track identifiers used for new tracks or dynamic tracks should not conflict with any identifier for track, track groups, entity group, or items. Preferably, a reserved range of identifiers in the 32 bits allocated for the track identifiers may be used. For example, it may be considered that the track identifiers above 0x10000000 are reserved for new or dynamic tracks to avoid any conflict with static tracks, that is to say the tracks declared in the MovieBox ('moov') box.

It is noted that a 'trak' box defined in a movie fragment should be empty (i.e. the 'trak' box does not define any sample and the mandatory boxes such as TimeToSampleBox ('stts') box, SampleToChunkBox ('stsc') box, and ChunkOffsetBox ('stco') box defining the timing or offsets of samples should have no entries (entry_count=0)), should contain at least one sample entry describing the coding format of samples belonging to this track (illustrated by the sample entry with 4CC 'yyyy') and contained in the movie fragment, and should have no SampleGroupDescriptionBox ('sgpd') box defined. The samples of the track are implicitly fragmented. The duration in the TrackHeaderBox (tkhd') box of a TrackBox ('trak') box in a movie fragment should be 0.

According to some embodiments, the MovieFragmentBox ('moof') box contains a TrackFragmentBox ('traf') box for each track for which there are associated samples stored in the associated MediaDataBox ('mdat') box, that is to say for tracks defined within the initialization fragment and for tracks defined in the considered movie fragment, for example the new track defined in 'trak' box 345. Therefore, according to the illustrated example, 'moof' box 330 contains two TrackFragmentBox ('traf') boxes, one for the track having a track identifier track_ID equal to 1 ('traf' box 350) and one for the new track having a track identifier track_ID equal to 2 ('traf' box 355).

The TrackFragmentHeaderBox ('tfhd') box of a 'traf' box referring to a new track not previously defined in a Movie-Box ('moov') box preferably has the following flags set in tf_flags parameter indicating information that should be present in the TrackFragmentHeaderBox ('tfhd') box of the new track (because there is no associated TrackExtendsBox ('trex') box declared in the MovieBox ('moov') box for this new track that would provide corresponding default values): sample-description-index-present, default-sample-duration-present, default-sample-size-present, and default-sample-flags-present.

It is noted that any new track defined in a movie fragment may benefit from all usual track mechanisms, e.g. may reference another track or may belong to a group of tracks, by defining corresponding boxes in the 'trak' box, for example in 'trak' box 345, e.g. by using respectively a TrackReferenceBox ('tref') box or a TrackGroupBox ('trgr') box. According to some embodiments, a static track (i.e. a track initially defined in the MovieBox box) cannot reference a dynamic track (i.e. a track defined in a Mov-ieFragmentBox box) through track reference box, but a dynamic track may reference a static track. Dynamic track may reference another dynamic track through track reference box provided that they are declared in the same movie fragments (references are ignored when a referenced track is not present.

In a variant, a new or dynamic track may be defined by using a dedicated box with a new 4CC (e.g. the TemporaryTrackBox box having 4CC 'ttrk' or DynamicTrackBox box having 4CC ('dntk')). Such a dedicated box may be a light version of the TrackBox hierarchy of boxes. It may contain at least a track identifier, a media handler type specifying whether the track is a video, audio, or metadata track, a description of the content of samples composing the track and a data reference indicating the location of samples (i.e. whether samples are located in a MediaDataBox ('mdat') box or in an IdentifiedMediaDataBox ('imda') box). For instance, this dedicated box may contain a TrackHeaderBox ('tkhd') box providing the track identifier, an HandlerBox ('hdlr') box providing the media handler type, a Sample-DescriptionBox ('stsd') box providing description of samples content, and a DataReferenceBox ('dref') box indicating the location of samples (e.g. in a MediaDataBox ('mdat') box or an IdentifiedMediaDataBox ('imda') box).

In another variant, a new or dynamic track may be defined by extending the TrackFragmentBox ('traf') box. A new version of the box (e.g. version=1) or a new flag value (e.g. the new flag value trak_in_moof in tf_flags parameter) of its TrackFragmentHeaderBox ('tfhd') box may be defined to signal to a reader that this TrackFragmentBox ('traf') box corresponds to a new track not previously defined in the MovieBox box. When this new version of 'tfhd' box is used or when this new flag value trak_in_moof is set in 'tfhd' box, the 'traf' box contains a MediaInformationBox ('mdia') box providing at least the media handler type, a description of the samples composing the track, without defining the samples (i.e. without defining timing and offsets of samples, the samples being defined within the TrackRunBox ('trun') box) and a data reference indicating the location of samples (e.g. either in a MediaDataBox ('mdat') box or in an IdentifiedMediaDataBox ('imda') box).

In yet another variant, when this new version of the 'tfhd' box is used or when this new tf_flags value trak_in_moof is set in the 'tfhd' box, the 'traf' box may contain some of the following boxes: MediaHeaderBox ('mdhd'), HandlerBox ('hdlr'), DataReferenceBox ('dref'), and/or SampleDescriptionBox ('stsd').

Still according to the above embodiment and its variants, providing the possibility to define a new or dynamic track in a movie fragment not previously defined in a MovieBox ('moov') box may be signalled to a reader by defining a new DynamicTracksConfigurationBox ('dytk') box, for example 'dytk' box 330, in the MovieExtendsBox ('mvex') box, for example in 'mvex' box 360 in 'moov' box 300.

The 'dytk' box may be defined as follows:

```
BoxType: 'dytk'
Container: MovieExtendsBox
Mandatory: Yes if TrackBox is present in movie fragments
Quantity: Zero or one
aligned(8) class DynamicTracksConfigurationBox
    extends FullBox('dytk', 0, 0){ }
```

According to some embodiments, the presence of this box indicates that a track not previously defined in a MovieBox box may be declared or is authorized inside a movie fragment. Conversely, the absence of this box indicates that no other track than the tracks previously defined in a MovieBox box can be present in any MovieFragmentBox ('moof') box, i.e. it is not authorized to declare a new track in any MovieFragmentBox ('moof') box.

In a variant, the possibility to define a new track in a movie fragment, not previously defined in a MovieBox box (e.g. a dynamic track), is signalled to a reader by defining a new flags value such as a track_in_moof flag in the MovieExtendsHeaderBox ('mehd') box of the MovieExtendsBox ('mvex') box, for example in 'mvex' box 360, for example as follows:

track_in_moof: flag mask is 0x000001:

when set, it indicates that a track not previously defined in a MovieBox box may be defined inside a movie fragment (i.e. for example, a TrackBox box may be declared inside a MovieFragmentBox ('moof') box), when not set, no other track than the tracks previously defined in a MovieBox box (i.e. static tracks) can be defined in any MovieFragmentBox ('moof') box (i.e., for example a TrackBox box should not be present in any MovieFragmentBox ('moof') box).

In another variant, the flags value track_in_moof is preferably defined in the MovieHeaderBox ('mvhd') box in the MovieBox ('moov') box (not represented in FIG. 3) instead of the MovieExtendsHeaderBox ('mehd') box. This avoids indicating the optional MovieExtendsHeaderBox ('mehd') box that is sometimes not available in derived specification (for example in the Common Media Application Format CMAF when the duration of a movie fragment is unknown).

An advantage of the embodiment described above and of its variants is that a writer does not have any more to know the worst case possible, i.e., all possible tracks and their configuration ahead of time to produce an initial MovieBox ('moov') box. It can introduce a new or dynamic track when it becomes available for the duration of a movie fragment (for instance, the addition of one or more media streams corresponding to additional languages or subtitles, or additional camera views).

Figure 4:
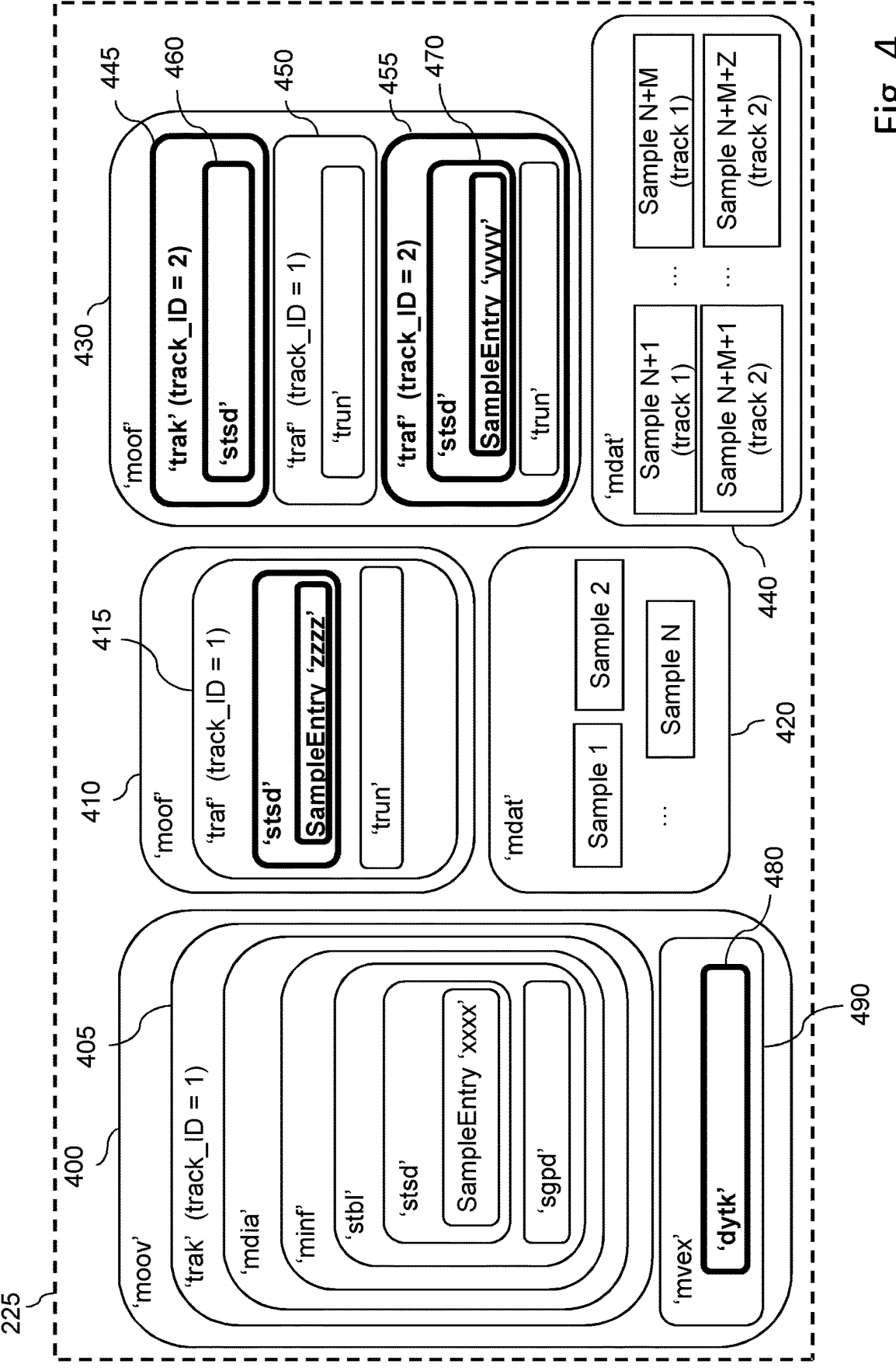
FIG. 4 illustrates an example of a fragmented presentation encapsulated within one or more media files, wherein a sample entry and/or a track are defined in a movie fragment according to some embodiments of the invention.

FIG. 4 illustrates an example of a fragmented presentation encapsulated within one or more media files, wherein a sample entry and/or a track are defined in a movie fragment according to some embodiments of the invention.

According to the embodiments described by reference to FIG. 4, the ISOBMFF is extended to allow defining a sample entry in a movie fragment for a track defined in a MovieBox ('moov') box, the new sample entry being not previously defined in the MovieBox ('moov') box, in addition to making it possible to define a new or dynamic track in a movie fragment as described by reference to FIG. 3. Such sample entry, present in a track fragment, may be called dynamic sample description or dynamic sample entry.

As illustrated, the MovieBox ('moov') box referenced 400 provides a description of a presentation that is initially composed of at least one track defined by the TrackBox ('trak') box referenced 405 having a track identifier track_ID equal to 1 and declaring a sequence of samples having a coding format described by the sample entry illustrated with the 4CC 'xxxx'.

According to the illustrated example, 'moov' box 400 is followed by two movie fragments. The first movie fragment is composed of the MovieFragmentBox ('moof') box referenced 410 and of the MediaDataBox ('mdat') box referenced 420. This first movie fragment defines a new sample entry illustrated with the 4CC 'zzzz' for the track having a track identifier track_ID equal to 1. It stores samples in 'mdat' box 420 for the track fragment described by a TrackFragmentBox ('traf') having a track identifier track_ID equal to 1 in 'moof' box 410.

The second movie fragment defines a new or dynamic track (i.e. the track having a track identifier track_ID equal to 2) in its MovieFragmentBox ('moof') box referenced 430, that is not defined in the 'moov' box 400. It stores samples for two tracks in its MediaDataBox ('mdat') box referenced 440: samples N+1 to N+M for the track having a track identifier track_ID equal to 1 and samples N+M+1 to N+M+Z for the new track having a track identifier track_ID equal to 2.

According to some embodiments of the invention, a new or dynamic track or a new (or dynamic) sample entry for a track already defined in a MovieBox box may be defined in any movie fragment in the presentation. A new track and a new sample entry may be defined in the same movie fragment or in different movie fragments. In addition, the same new track and/or the same new sample entry may be defined in different movie fragments.

In order to support the definition of a new sample entry in a movie fragment, ISOBMFF is extended to allow declaring the sample description box, not only within the SampleTableBox ('stbl') box of a TrackBox ('trak') box in a MovieBox ('moov') box, but also in the TrackFragmentBox ('traf') box of a MovieFragmentBox ('moof') box as follows:

---

Box Types: 'stsd'
Container: SampleTableBox or TrackFragmentBox
Mandatory: Yes
Quantity: Exactly one

---

Accordingly, it is possible to declare new sample entries with different coding format parameters at movie fragment level. This is useful for instance when there is a change of codec configuration of an encoded media data or stream (e.g., an unexpected switch from the AVC HD format to the HEVC UHD format) or a change of content protection information (e.g., an unexpected switch from a clear format to a protected format). Indeed, some application profiles, for example in DVB specification, require support of multiple codecs. This means that codec change may occur during a multimedia presentation or program. When this occurs in a live program (and was not known at the beginning), dynamic sample entries allow signalling such codec change. More generally, encoding parameters change, even when codec remains the same, may be signalled with dynamic sample entries.

Samples (e.g. the samples 1 to N belonging to the track having a track identifier track_ID equal to 1) are associated with a sample entry via a sample description index value. The range of values for the sample description index may be split into several ranges to make it possible to use one sample entry or another. For the sake of illustration, the range of values for the sample description index may be split into two ranges to use a sample entry defined in the 'trak' box 405 or a sample entry defined in 'traf' box 415, for example as follows:

values from 0x0001 to 0x10000: these values indicate the index of the sample entry (or sample description) in the SampleDescriptionBox ('stsd') box contained in the TrackBox ('trak') box corresponding to the indicated track_ID in the TrackFragmentBox ('traf') box; and values 0x10001->0xFFFFFFFF: these values indicate the index incremented by 0x10000 of the sample entry (or sample description) in the SampleDescriptionBox ('stsd') box contained in the TrackFragmentBox ('traf') box corresponding to the indicated track_ID.

Therefore, depending on the associated sample description index value, the samples 1 to N stored in 'mdat' box 420 would be associated with either the sample entry with 4CC 'xxxx' defined in 'trak' box 405 or the sample entry with 4CC 'zzzz' defined in the 'traf' box 415.

When a SampleDescriptionBox ('stsd') box is present in a TrackFragmentBox ('traf') box, it is preferably placed immediately after the TrackFragmentHeaderBox ('tfhd') box. According to some embodiments, the sample entries given in a SampleDescriptionBox ('stsd') box defined in a TrackFragmentBox ('traf') box of a movie fragment are only valid for the lifetime of the movie fragment.

Still according to some embodiments where dynamic sample entries may be declared in movie fragments, the new or dynamic track in the second movie fragment (or any new track in any movie fragment) may be declared as described by reference to FIG. 3.

In the embodiment illustrated in FIG. 4, the new track is declared by defining the TrackBox ('trak') box referenced 445 in the MovieFragmentBox ('moof') box referenced 430.

For this purpose, the definition of a TrackBox ('trak') box may be modified to authorize its definition in a MovieFragmentBox as follows:

---

Box Type: 'trak'
Container: MovieBox or MovieFragmentBox
Mandatory: Yes
Quantity: One or more

---

When a TrackBox ('trak') box (e.g., 'trak' box 445) is present in a MovieFragmentBox ('moof') box (e.g., 'moof' box 430), it is preferably placed before any TrackFragmentBox ('traf') box (e.g., 'trak' box 445 is placed before 'traf' boxes 450 and 455). The track defined in this case is only valid for the lifetime of the corresponding movie fragment. Such a new or dynamic track should not have the same track identifier (track_ID) as any track defined in the MovieBox box, but may have the same track identifier as a track defined in one or more other movie fragments to identify a continuation of the same track, in which case these TrackBox boxes identical (bit to bit).

Again, to span over multiple fragments, multiple declarations of the new tracks, or dynamic tracks, are required from one fragment to another, in order to guarantee random access on each track fragment. The continuity of one or more new tracks or dynamic tracks may concern some movie fragments corresponding to a period of time, but not necessarily all movie fragments covering this period of time. In a variant, to determine the continuity of a new track or dynamic track over two movie fragments (not necessarily consecutive), a parser or reader can simply compare the TrackBox payloads: if they are equal (bit to bit), the parser or reader can safely consider it is the same track and may avoid some decoder reinitialization. If they are not equal (even if the same track identifier is used), the parser or reader should consider that it is a different track than the previous one. Preferably, it may be recommended to allocate different track identifiers to new tracks or dynamic tracks in the case where there is no continuity between these tracks over different movie fragments. More generally, the track identifier of a new track or dynamic track should not conflict with any other track identifier within the MovieBox box (to that end, the writer may use the next track identifier value). When the file is encapsulated using the 'unif' brand, track identifiers used for new tracks or dynamic tracks should not conflict with any identifier for track, track groups, entity group, or items. Preferably, a reserved range of identifiers in the 32 bits allocated for the track identifiers may be used. For example, it may be considered that the track identifiers above 0x10000000 are reserved for new or dynamic tracks to avoid any conflict with static tracks, that is to say the tracks declared in the MovieBox ('moov') box.

Again, it is noted that a TrackBox ('trak') box such as 'trak' box 445 defined in a movie fragment should be empty (i.e. the 'trak box does not define any sample and mandatory boxes such as TimeToSampleBox ('stts') box, SampleToC-hunkBox ('stsc') box or ChunkOffsetBox ('stco') box defining the timing or offsets of samples should have no entries (entry_count=0)), should have an empty SampleDescriptionBox ('stsd') box (e.g., 'stsd' box 460), and should have no SampleGroupDescriptionBox ('sgpd') defined. The samples of the track are implicitly fragmented. The duration in the TrackHeaderBox ('tkhd') box of a TrackBox ('trak') box (e.g., 'trak' box 445) in a movie fragment should be 0.

According to some embodiments, the MovieFragment ('moof') box contains a TrackFragmentBox ('traf') box for each track for which there are associated samples stored in the associated MediaDataBox ('mdat') box, that is to say for tracks defined within the initialization fragment and for tracks defined in the considered movie fragment, for example the new track defined in 'trak' box 445. Therefore, according to the illustrated example, 'moof' box 430 contains two TrackFragmentBox ('traf') boxes, one for the track having a track identifier track_ID equal to 1 ('traf' box 450), and one for the new or dynamic track having a track identifier track_ID equal to 2 ('traf' box 455).

Again, the TrackFragmentHeaderBox ('tfhd') box of a 'traf' box referring to a new track not previously defined in a MovieBox box preferably has the following flags set in tf_flags (description of track fragment properties through a list of flags):sample-description-index-present, default-sample-duration-present, default-sample-size-present, default-sample-flags-present. These flags are indicated because there is no associated TrackExtendsBox ('trex') box for this new or dynamic track providing default values for the samples (N+M+1 to N+M+Z) in the track fragment.

When a TrackBox ('traf') box (e.g., 'traf' box 445) is declared in a MovieFragmentBox ('moof') box (e.g., 'moof' box 430), a SampleDescriptionBox ('stsd') box (e.g., 'stsd' box 470) should be declared in the TrackFragmentBox ('traf') box (e.g., 'traf' box 455) having the same track identifier as this TrackBox ('trak') box (e.g., 'trak' box 445).

Again, it is noted that any new track defined in a movie fragment may benefit from all usual track mechanisms, e.g. may reference another track or may belong to a group of tracks, by defining corresponding boxes in the TrackBox ('trak') box (e.g., in 'trak' box 445), for example by using respectively a TrackReferenceBox ('tref') box or a TrackGroupBox ('trgr') box. According to some embodiments, a static track (i.e. a track initially defined in the MovieBox box) cannot reference a dynamic track (i.e. a track defined in a MovieFragmentBox box) through a track reference box, but a dynamic track may reference a static track. Dynamic track may also reference another dynamic track through a track reference box provided that they are declared in the same movie fragment (references are ignored when a referenced track is not present).

In a variant, a new or dynamic track may be defined by using a dedicated box with a new 4CC (e.g. TemporaryTrackBox box having 4CC 'ttrk' or DynamicTrackBox box having 4CC ('dntk')). Such a dedicated box may be a light version of the TrackBox hierarchy of boxes. It may contain at least a track identifier, a media handler type specifying whether the track is a video, audio, or metadata track and a data reference indicating the location of samples (i.e. whether samples are located in a MediaDataBox ('mdat') box or in an IdentifiedMediaDataBox ('imda') box). In this variant, it doesn't need to contain a description of the samples composing the track since this description would be provided by a sample entry (e.g., sample entry 'yyyy') declared in the SampleDescriptionBox ('stsd') box (e.g., 'stsd' box 470) of the TrackFragmentBox ('traf') box having the same track identifier (e.g., 'traf' box 455).

As apparent from the one skilled in the art, other embodiments or variants of defining a new or dynamic track described by reference to FIG. 3 also apply here.

Still according to the above embodiment and its variants, providing the possibility to define a new track and/or a new sample entry in a movie fragment, not previously defined in the a MovieBox box may be signalled to a reader at the beginning of the file. This indication may help readers to determine whether they can support the media file or only some tracks in the file. This may be done for example by defining a new DynamicTracksConfigurationBox ('dytk') box (e.g., 'dytk') box 480) in a MovieExtendsBox ('mvex') box (e.g., 'mvex' box 490) in a MovieBox ('moov') box (e.g., 'moov' box 400). (name and 4cc are just an example)

The 'dytk' box may be defined as follows:

```
BoxType: 'dytk'
Container: MovieExtendsBox
Mandatory: Yes if TrackBox or SampleDescriptionBox are present in
movie fragments
Quantity: Zero or one
aligned(8) class DynamicTracksConfigurationBox
    extends FullBox('dytk', 0, flags){ }
```

According to some embodiments, this box can be used to signal the presence of a TrackBox ('trak') box (or similar boxes depending on variants, e.g. the presence of a TemporaryTrackBox ('ttrk') box) or of a SampleDescriptionBox ('stsd') box in a movie fragment. For the sake of illustration, the following flags values may be used and defined as follows:

track_in_moof: flag mask is 0x000001:

when set, it indicates that TrackBox ('trak') boxes may be declared inside movie fragments, when not set, MovieFragmentBox boxes should not comprise any TrackBox ('trak') box;

stsd_in_traf: flag mask is 0x000002:

when set, it indicates that a SampleDescriptionBox ('stsd') box may be declared inside a TrackFragmentBox ('traf') box, when not set, TrackFragmentBox ('traf') boxes should not comprise any SampleDescriptionBox ('stsd') box.

In a variant, the possibility to define a new or dynamic track (i.e., a track not previously defined in a MovieBox box) in a movie fragment is signalled to a reader by defining a new flags value, for example the new flags value track_in_moof, in a MovieExtendsHeaderBox ('mehd') box of a MovieExtendsBox ('mvex') box (e.g., 'mvex') box 490) as follows:

track_in_moof: flag mask is 0x000001:

when set, it indicates that a track not previously defined in a MovieBox box may be defined inside a movie fragment (i.e. for example, a TrackBox box may be declared inside a MovieFragmentBox ('moof') box), when not set, no other track than the tracks previously defined in a MovieBox box (i.e. static tracks) can be defined in any MovieFragmentBox ('moof') box (i.e., for example a TrackBox box should not be present in any MovieFragmentBox ('moof') box).

In another variant, the flags value track_in_moof is preferably defined in the MovieHeaderBox ('mvhd') box in the MovieBox ('moov') box (not represented in FIG. 3) instead of the MovieExtendsHeaderBox ('mehd') box. This avoids indicating the optional MovieExtendsHeaderBox ('mehd') box that is sometimes not available in derived specification (for example in the Common Media Application Format CMAF when the duration of a movie fragment is unknown).

Similarly, the possibility to define a new sample entry in a movie fragment (i.e., a sample entry not previously defined in a MovieBox box) may be signalled to a reader by defining a new flag, for example the flags value stsd_in_traf, in a TrackExtendsBox ('trex') box of a MovieExtendsBox ('mvex') box (e.g., 'mvex') box 490) as follows:

stsd_in_traf: flag mask is 0x000001:

when set, it signals that a SampleDescriptionBox ('stsd') box may be declared inside a TrackFragmentBox ('traf') box having the same track identifier as the one set in an associated TrackExtendsBox ('trex') box, when not set, a TrackFragmentBox ('traf') box should not comprise any SampleDescriptionBox ('stsd') box.

In another variant, the flags value stsd_in_traf is preferably defined in the SampleDescriptionBox ('stsd') box in the MovieBox ('moov') box instead of the TrackExtendsBox ('trex') box. According to this variant, the reader can directly know when parsing the SampleDescriptionBox ('stsd') box whether sample descriptions may be updated during the presentation without parsing an extra box in MovieExtendBox ('mvex') box. For example, when the SampleDescriptionBox ('stsd') box has the flags value stsd_in_traf that is not set, parsers are guaranteed that all the possible sample entries for a given track are declared in the MovieBox ('moov') box part of the file, i.e. in the initialization fragment. On the contrary, when a SampleDescriptionBox ('stsd') box has the flags value stsd_in_traf that is set, this is an indication to parsers that for the corresponding track, some additional, new or dynamic sample entries may be later defined in subsequent movie fragments.

In another variant, the possibility to define either a new track and/or a new sample entry in a movie fragment is signalled to a reader by defining a new DynamicTracksConfigurationBox ('dytk') box in a MovieExtendsBox ('mvex') box in a MovieBox ('moov') box, for example defining 'dytk' 480 in 'mvex' box 490 in 'moov' box 400.

The DynamicTracksConfigurationBox ('dytk') box may be defined as follows:

```
BoxType: 'dytk'
Container: MovieExtendsBox
Mandatory: Yes if TrackBox or SampleDescriptionBox are present in
movie fragments
Quantity: Zero or one
aligned(8) class DynamicTracksConfigurationBox
extends FullBox('dytk', 0, flags){
    if ( ! (flags & all_tracks_dynamic_stsd)) {
        unsigned int(32) nb_tracks;
        unsigned int(32) trackIDs[nb_tracks];
    }
}
```

This box can be used to signal the presence of a TrackBox ('trak') box or of a SampleDescriptionBox ('stsd') box in a movie fragment. To that end, the following flags may be defined:

track_in_moof: flag mask is 0x000001:

when set, it indicates that a TrackBox ('trak') box may be declared inside a movie fragment, when not set, MovieFragmentBox boxes should not comprise any TrackBox ('trak') box;

all_tracks_dynamic_stsd: flag mask is 0x000002:

when set, it indicates that a SampleDescriptionBox ('stsd') box may be declared inside a TrackFragmentBox ('traf') box for any track defined in the movie, when not set, TrackFragmentBox ('traf') boxes not signalled in the considered 'dytk' box should not comprise any SampleDescriptionBox ('stsd').

In addition, following semantics may be defined for the parameters of the DynamicTracksConfigurationBox ('dytk') box:

nb_tracks gives the number of trackID listed;

trackIDs indicate the track identifiers of the tracks for which a SampleDescriptionBox ('stsd') box may be declared inside a TrackFragmentBox ('traf') box. If the all_tracks_dynamic_stsd flag is not set and a track is not listed in this box, a SampleDescriptionBox ('stsd') box should not be present in any TrackFragmentBox ('traf') box for this track.

Still according to above embodiments, the presence of either a new or dynamic track or a new or dynamic sample entry in a movie fragment may be further signalled to the reader by defining the following flags values in the MovieFragmentHeaderBox ('mfhd') box in a MovieFragmentBox ('moof') box:

new-track-present (or dynamic-track-present): flag mask is 0x000001:

when set, it indicates that a new (or dynamic) track is declared inside this movie fragment, when not set, it indicates that no new (or dynamic) track is declared inside this movie fragment;

stsd-present: flag mask is 0x000001:

when set, it indicates that a SampleDescriptionBox ('stsd') box is declared inside this movie fragment, when not set, it indicates that no SampleDescription-Box ('stsd') box is declared inside this movie fragment.

While the signalling within the MovieBox ('moov') box of a new (or dynamic) track or sample entry signals to the reader that it may have to process a new track or a new sample description in subsequent media fragments during the presentation, this signalling in movie fragment allows signalling to a reader whether or not the current movie fragment actually contains new track or sample description definitions. In addition, the MovieFragmentHeaderBox ('mfhd') box in a MovieFragmentBox ('moof') box may be extended by declaring a new version (e.g. version=1) of the box and by adding a parameter next_track_ID. This parameter would contain the next track identifier value that could be used to create a new or dynamic track in the next media fragment. It generally contains a value one greater than the largest identifier value in use at file level found in the presentation up to and including the current media fragment. This enables easy generation of a unique track identifier without knowing all previous media fragments between the MovieBox ('moov') box and the last generated media fragment.

According to some embodiments, the encapsulation module may use a brand (either defined at file level in a FileTypeBox ('ftyp') box, at segment level in a Segment-TypeBox ('styp') or at track level in a TrackTypeBox ('ttyp') box), an existing or a new box or even a field or a flags value within these existing or new box(es) to indicate that new tracks or new sample entries may be declared in a media file or media segments. When no such indication is used by encapsulation module, parsers do not have to check presence of new tracks or sample entries. On the contrary, when such indication is present, a parser according to this invention should check at the beginning of a movie fragment the presence of new or dynamic tracks or sample entry and eventually checks continuation of new or dynamic tracks.

Figure 5:
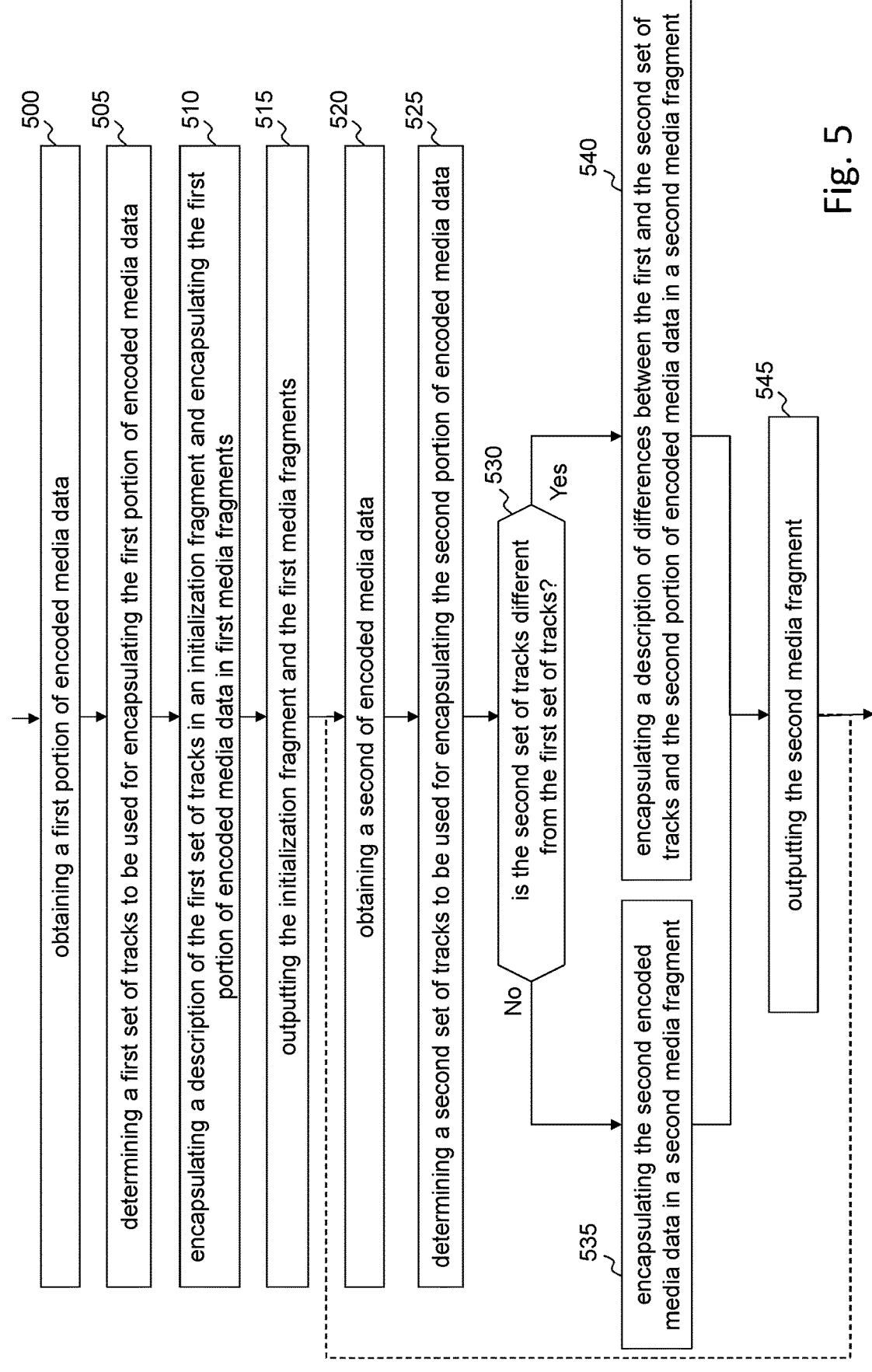
FIG. 5 is a block diagram illustrating an example of steps carried out by a server or writer to encapsulate encoded media data according to some embodiments of the invention.

FIG. 5 is a block diagram illustrating an example of steps carried out by a server or writer to encapsulate encoded media data according to some embodiments of the invention.

Such steps may be carried out, for example, in the encapsulation module 220 in FIG. 2.

As illustrated, a first step (step 500) is directed to obtaining a first portion of encoded media data that may be composed of one or more bit-streams representing encoded timed sequence of video, audio, and/or metadata including one or more bit-stream features (e.g. scalability layers, temporal sub-layers, and/or spatial sub-parts such as HEVC tiles or VVC sub-pictures). Potentially, multiple alternatives of the encoded media data can be obtained, for example in terms of quality and resolution. The encoding is optional, the encoded media data may be raw media data.

From this first portion of encoded media data, the encapsulation module determines (step 505) a first set of tracks to be used to encapsulate the first portion of encoded media data. It may determine to use one track per bit-stream (e.g. one track for one video bit-stream, one track for one audio bit-stream, or two tracks for two video bit-streams, one track per video bit-stream). It may also multiplex multiple bit-streams in one track (e.g. a multiplexed audio-video track). It may also split a bit-stream into multiple tracks (e.g. one track per layer or one track per spatial sub-pictures). It may also define additional track providing instructions to combine other tracks (e.g. a VVC base track used to describe the composition of several VVC sub-picture tracks).

Next, at step 510, a description of the determined first set of tracks and associated sample entries is generated and encapsulated in an initialization fragment comprising a MovieBox box such as 'moov' box 300 or 'moov' box 400. Such a description may comprise defining one TrackBox box such as 'trak' box 305 or 'trak' box 405, including one or more sample entries, in the MovieBox box, for each track of the first set of tracks. In addition, the encapsulation module signals in a MovieExtendsBox box that some tracks of the first set of tracks are fragmented and that a new track and/or a new sample entry may be defined later on in a movie fragment according to aforementioned embodiments. Each timed unit of the encoded media data corresponding to the first set of tracks is encapsulated in samples in each corresponding track in one or more movie fragments (also denoted first media fragments), each media fragment being composed of one MovieFragmentBox('moof') box and one MediaDataBox ('mdat') box.

Next, during steps 515, the initialization fragment and the first media fragments may be outputted or stored, possibly as an initialization segment file followed by a set of media segment files, each media segment file containing one or more media fragments. It is noted that such a step (step 515) is optional since, for example, the initialization fragment and the first media fragments may be outputted later with second media fragments.

Next, at step 520, the encapsulation module obtains a second portion of encoded media data. The second portion of encoded media data may be composed of the temporal continuation of the same bit-streams as for the first portion of encoded media data. The temporal continuation of a bit-stream may be encoded in a different coding format or parameters (e.g. changing from an AVC HD coding format to a HEVC 4K coding format), a different protection or encryption scheme, or a different packing organisation (e.g. for stereoscopy or region-wise packing of omnidirectional media). The second encoded media data may be also composed of some additional bit-streams not present in the first encoded media data (e.g. a new subtitle or audio language bit-stream or a new video bit-stream corresponding to a new camera or viewpoint or to a detected object or to a region of interest).

Next, at step 525, the encapsulation module determines a second set of tracks and associated sample entries to be used for encapsulating the second portion of encoded media data. It may decide to keep the same set of tracks for the second portion of encoded media data when the second portion of encoded media data is a simple temporal continuation of the first portion of encoded media data. It may also decide to change the number of tracks, for example to encapsulate in a different way a temporal continuation of the first portion of encoded media data (e.g. a VVC bit-stream comprising subpictures may be encapsulated in one single track for a first time period and then be encapsulated in multiple tracks for a second time period, e.g. a VVC base track and multiple VVC subpicture tracks). It may also add new tracks for encapsulating additional bit-streams of the second portion of encoded media data, being noted that some of the additional bit-streams may be multiplexed with some of the previous existing bit-streams. It may also define new sample entries for bit-streams of the second portion of encoded media data if changes occur in this second portion, for example if the coding format or codec profile and/or the protection scheme or packing or any information in the sample description changes.

Next, at step 530, it is determined whether the description of the second set of tracks is the same as the description of the first set of tracks declared in the MovieBox box. If the description of the second set of tracks is the same as the description of the first set of tracks, the second portion of encoded media data is encapsulated in movie fragments (i.e. second media fragments) on a standard basis using the tracks and the sample entries previously defined in the MovieBox box (step 535).

Otherwise, if there is a new track in the second set of tracks compared to the first set of tracks, a new track is defined in the movie fragment. Likewise, if there is a new sample entry associated with the second set of tracks compared to the sample entries associated with the first set of tracks, a new sample entry is defined in the movie fragment. Defining a new track and/or a new sample entry may be done as described in reference to FIG. 3 or 4.

The description of a new track and/or a new sample entry are encapsulated with the second portion of encoded media data in a second media fragment (step 540). Next, at step 545, the second media fragment is outputted, for example transmitted to a client via a communication network, or stored in a storage mean. The media fragments can be stored or transmitted as segment files or appended with the first media fragments in an ISO base media file As illustrated with the dotted arrow, the process loops at step 520 if there are still encoded media data to encapsulate, until there is no more encoded media data to process.

FIG. 6 is a block diagram illustrating an example of steps carried out by a client, parser or reader to process encapsulated media data according to some embodiments of the invention.

Such steps may be carried out, for example, in the de-encapsulation module 260 in FIG. 2.

As illustrated, a first step (step 600) is directed to obtaining an initialization fragment corresponding to a MovieBox box. This initialization fragment may be obtained by parsing an initialization segment file received from the communication network or by reading a file on a storage mean.

Next, at step 605, the obtained MovieBox box is parsed to obtain a first set of tracks corresponding to the description of all the tracks defined for the presentation and to obtain the associated sample entries describing the coding format of the samples in each track. The de-encapsulation module 260 may determine at this same step from brand information or specific box (e.g. 'dytk' 480) in the initialization fragment that the file or some segments may contain dynamic (or new) tracks or dynamic (or new) sample entries.

Next, at step 610, the processing and decoding of encoded media data encapsulated in tracks is initialized using items of information from the first set of tracks and using the associated sample entries. Typically, the media decoders are initialized with decoder configuration information present in the sample entries.

Next, at step 615, the de-encapsulation module obtains movie fragments (also denoted media fragments) by parsing media segment files received from the communication network or by reading media segment files on a storage mean.

Next, at step 620, the de-encapsulation module determines a second set of tracks from information obtained when parsing MovieFragmentBox and TrackFragmentBox boxes present in the obtained movie fragments. In particular, it determines if one or more new tracks and/or one or more new sample entries are signalled and defined in MovieFragmentBox and/or TrackFragmentBox boxes according to aforementioned embodiments.

Next, at step 615, it is determined whether the second set of tracks and the associated sample entries are different from the first set of tracks and the associated sample entries. If the second set of tracks and the associated sample entries are different from the first set of tracks and the associated sample entries, the configuration of the processing and decoding of encoded media data is updated using items of information obtained from the MovieFragmentBox and/or TrackFragmentBox boxes of an obtained media fragment (step 630). For instance, a new decoder may be instantiated to process a new bit-stream or a decoder can be reconfigured to process a bit-stream with changing coding format, codec profile, encoding parameters, protection scheme, or packing organisation.

After having updated the configuration of the processing and decoding of encoded media data or if the second set of tracks and the associated sample entries are the same as the first set of tracks and the associated sample entries, the encoded media data are de-encapsulated from the samples of movie fragments and processed (step 670), for example to be decoded and displayed or to be rendered to the user.

As illustrated with the dotted arrow, the process loops to step 615 if there are more media fragments to process, until there is no more media fragment to process.

According to another aspect of the invention, still for signalling some functionalities of the encapsulation mechanisms that should be understood by a reader to parse and to decode the encapsulated media data, to help the reader selecting the data to be processed, the data of a sample or of a NALU (Network Abstraction Layer (NAL) unit) within a sample that are actually corrupted are signalled. Data corruption may happen, for example, when data are received through an error-prone communication mean. To signal corrupted data in the bit-stream to be encapsulated, a new sample group description with grouping_type 'corr' (or any other predetermined name) may be defined. This sample group 'corr' can be defined in any kind of tracks (e.g. video, audio, or metadata) to signal sets of samples in the track that are corrupted or lost. For the sake of illustration, an entry of this sample group description may be defined as follows:

```
class CorruptedSampleInfoEntry( )
extends SampleGroupDescriptionEntry ('corr')
{
    bit(2) corrupted;
    bit(6) reserved;
}
``` where corrupted is a parameter that indicates the corruption state of the associated data.

According to some embodiments, value 1 means that the entire set of data is lost. In such a case, the associated data size (sample size, or NAL size) should be set to 0. Value 2 means that the data are corrupted in such a way that they cannot be recovered by a resilient decoder (for example, loss of a slice header of a NAL). Value 3 means that the data are corrupted, but that they may still be processed by an error-resilient decoder. Value 0 is reserved.

According to some embodiments, no associated grouping_type_parameter is defined for CorruptedSampleInfoEntry. If some data are not associated with an entry in CorruptedSampleInfoEntry, this means these data are not corrupted.

A SampleToGroup ('sbgp') box with a grouping_type equal to 'corr' allows associating a CorruptedSampleInfoEntry with each sample and indicating whether the sample contains corrupted data.

This sample group description with grouping_type 'corr' can be also advantageously combined within the NALU mapping mechanism composed by a sampletogroup ('sbgp') box, a sample group description ('sgpd') box, both with grouping_type 'nalm' and sample group description entries NALUMapEntry. A NALU mapping mechanism with a grouping_type_parameter set to 'corr' allows signalling corrupted NALUs in a sample. The groupID of the NALU-MapEntry map entry indicates the index, beginning from one, in the sample group description of the CorruptedSam-pleInfoEntry. A groupID set to zero indicates that no entry is associated herewith (the identified data are present and not corrupted).

By using a sample group to indicate whether a sample is corrupted or not, it becomes important to be able to signal to a reader whether a sample group should be supported (parsed and understood) to process a sample. Indeed, in such a case, the sample entry alone may not be sufficient to determine whether a track will be supported.

According to a particular embodiment, a new version (e.g. version=3) of the SampleGroupDescriptionBox is defined. If the version of a SampleGroupDescriptionBox ('sgpd') is equal to 3, the sample group description describes essential information for the associated samples, and parsers, players or readers should not attempt to decode any track for which unrecognized sample group descriptions marked as essential are present.

In a variant of the simple version 3 of the SampleGroup-DescriptionBox ('sgpd') box, the essential indication may be indicated by a new parameter called, for example, "essen-tial" in the 'sgpd' box, as follows:

```
aligned(8) class SampleGroupDescriptionBox ( )
extends FullBox('sgpd', version, flags){
    unsigned int(32) grouping_type;
    if (version>=1) { unsigned int(32) default_length; }
    if (version>=2) {unsigned int(32)
default_group_description_index; }
    if (version >= 3) {
        unsigned int (1) essential;
        unsigned int (7) reserved, // =0
    }
    unsigned int(32) entry_count;
    // remaining parts are unchanged...
    ....
}
```

When the essential parameter takes the value 0, the sample group entries declared in this SampleGroupDescrip-tionBox ('sgpd') box are descriptive and may not be exposed to a parser, player or reader. When the essential parameter takes the value 1, the sample group entries declared in this SampleGroupDescriptionBox ('sgpd') box are mandatory to support in order to correctly process the samples mapped to these sample group entries and should be exposed to a parser, player or reader.

The essentiality of sample properties defined in a file by an essential sample group should be advertised through a MIME sub-parameter. This informs parsers or readers about additional expected requirements to support the file. For example, when a corrupted sample group is declared as essential, a player with a basic decoder may not support the track with such essential sample group. On the contrary, a media player with robust decoder (e.g. with concealment capabilities) may support the track with such essential sample group. This new sub-parameter, for example called "essential" takes as values a comma-separated list of four-character codes that correspond to grouping_types of sample groups declared as essential. For example:

```
codecs="avc1.420034", essential="4CC0"
``` indicates an AVC track with one essential sample groups of grouping type, e.g., 4CC0.

As another example:

```
codecs="hvc1.1.6.L186.80", essential="4CC1,4CC2"
``` indicates an HEVC track with two essential sample groups of grouping type, e.g., 4CC1 and 4CC2.

As a variant, instead of defining a new version of the SampleGroupDescriptionBox ('sgdb') box, it is possible to define a new value in the flags parameter of the Sample-GroupDescriptionBox ('sgdb') box as follows:

essential: with 4 (0x000004) and when set to 1, this flag indicates that the sample group description describes essential information for the associated samples, and file processors or file readers should not attempt to decode any track for which unrecognized sample group descriptions marked as essential are present.

As another variant, a new box name SampleGroupEssen-tialPropertyBox with four-character code 'sgep' (or any other name or not conflicting 4CC) may be defined with same syntax and semantics as the SampleGroupDescription-Box ('sgpd') except that it signals essential properties for group of samples that have to be supported by readers to process the track.

The support of the new version of the SampleGroupDe-scriptionBox box (or of its variants) is enforced to a reader by defining a new brand within the FileTypeBox ('ftyp'), SegmentTypeBox ('styp') or TrackTypeBox ('ttyp') boxes.

Therefore, an example of mechanism to signal essential properties for samples may rely on the use of two boxes:

a SampleToGroupBox ('sbgp') box that describes the assignment of each sample to a sample group and its essential sample group description and a SampleGroupDescriptionBox ('sgpd') box with the essential flags value (or parameter, or a Sample-GroupEssentialPropertyBox ('sgep') box depending of above variants) that describes essential properties of samples within a particular sample group. The Sample-GroupDescriptionBox ('sgpd') box (or Sample-GroupEssentialPropertyBox ('sgep') box) contains a list of SampleGroupEntry (VisualSampleGroupEntry for video content), each instance of SampleGroupEntry providing different values for the essential properties defined for a particular sample group (identified by its 'grouping_type').

A particular type of essential sample grouping is defined by the combination of one SampleToGroupBox ('sbgp') box and one SampleGroupDescriptionBox ('sgpd') box with essential flags value or parameter (or one SampleGroupEs-sentialPropertyBox 'sgep') box) via a type field ('grouping_type').

Similarly, essential properties can be associated with one or more Network Abstraction Layer (NAL) units within a sample by using the sample group of type 'nalm' described in ISO/IEC 14496-15. Essential properties are associated with one or more NAL units within one or more samples by associating a sample group of type 'nalm' with an essential sample group description box. The SampletoGroupBox ('sbgp') box with grouping type 'nalm' provides the index of the NALUMapEntry assigned to each group of samples and the grouping_type_parameter identifying the grouping_type of the associated essential sample group description box. The NALUMapEntry associates a groupID with each NAL unit in a sample, and the associated groupID provides the index of an entry in the essential sample group description providing the essential properties of associated NAL units.

For example, the grouping_type_parameter of the SampletoGroupBox ('sbgp') box with grouping type 'nalm' may be equal to 'corr' to associate the sample group of type 'nalm' with the sample group description of type 'corr' and thus signalling sets of NAL units in samples that are corrupted or lost.

Preferably, when a presentation is fragmented, if a sample group with a given grouping_type is initially marked as essential (e.g. in the MovieBox 'moov' box), and a sample group with same grouping_type is defined in a subsequent media fragment, then it should also be marked as essential.

According to some embodiments, the principle of essential sample group described afore may be used as an extensible way of mandating support for sample group descriptions in a track. In particular, essential sample groups could be used to describe transformations to be applied on samples either:

before decoding, i.e. when the content of samples has been transformed (e.g. by encryption) in such a way that it can no longer be decoded by the normal decoder or when the content should only be decoded when a protection system or scrambling operation applied to samples is understood and implemented by the player; or, after decoding, i.e. when the file author requires certain actions to be performed on the decoded samples before being played or rendered (e.g. if the content of decoded samples should be unpacked before rendering, e.g. as for a stereoscopic picture where left and right views are packed in a same picture).

Compared to transformations usually described using restricted sample entries or protected sample entries, essential sample groups provide several advantages among which the following advantages:

it does not require to change the sample entry four-character code (4CC) indicating the coding format of a sample. Therefore, it does not hide the original nature of the data in the track, and the player would not have to parse the whole hierarchy of restricted or protected sample entries to know the original format of the track, essential sample groups allow defining transformations with sample granularity more efficiently (less impact on file size and fragmentation), essential sample groups can easily support many, potentially nested transformations, and essential sample groups can easily support a new transformation whenever a new property is defined.

Another benefit of using a generic mechanism, like essential sample groups, for signalling transformations to be applied on samples is to allow some classes of file processors to operate on files using transformations unknown to the file processor. With the approach relying on restricted sample entries or protected sample entries, introducing a new transformation through sample entry requires updating the code of a dasher (e.g. a device preparing content to be streamed according to the Dynamic HTTP adaptive streaming (DASH) standard) or transcoder, which is always error-prone. With a generic mechanism such as essential sample groups, dashers and transcoders could process the file without understanding the nature of the transformation.

According to some embodiments, a transformation is defined as an essential sample group by declaring an essential sample group (e.g. using a SampleGroupDescriptionBox with version=3, or any alternatives described afore), with a grouping_type value identifying the type of the transformation (e.g. possibly corresponding to the scheme type of some known transformations e.g. 'stvi' for stereoscopic packing or 'cenc' or 'cbc1' for some common encryption 4CCs, or possibly corresponding to the 4CC of some known transformation properties such as 'clap' for cropping/clean aperture or 'irot' for rotation, or any 4CC corresponding to a new defined transformation). Properties of the transformations are declared in one or more SampleGroupDescription Entry( ) of the essential SampleGroupDescriptionBox, each entry corresponding to alternative values of the properties. One of the one or more SampleGroupDescriptionEntry( ) is associated with each sample of a track using a SampleToGroupBox or the default_group_description_index parameter of the SampleGroupDescriptionBox.

In an alternative, a transformation may be defined either as an essential sample group (e.g. using a SampleGroupDescriptionBox with version=3, or any alternatives described afore) when the transformation is essential or as a usual sample group (i.e. non-essential) when the transformation is optional (e.g. using a SampleGroupDescriptionBox with version<3 without any essential signalling).

When several sample groups defining transformations and/or descriptive properties are declared and associated with samples of a track, there is a need to define an order in which those sample groups have to be processed by a parser or reader for correctly decoding or rendering each sample.

According to some embodiments, a new essential sample group grouping_type, e.g. 'esgh', is defined with a SampleGroupDescriptionEntry EssentialDescriptionsHierarchyEntry as follows:

the EssentialDescriptionsHierarchyEntry sample group description indicates the processing order of the essential sample group descriptions applying to a given sample and the EssentialDescriptionsHierarchyEntry sample group description is an essential sample group description and uses the version 3 of SampleGroupDescriptionBox (or any other alternatives described afore).

This sample group is present if at least one essential sample group description is present.

Each essential sample group description, except the EssentialDescriptionsHierarchyEntry one, is listed in the EssentialDescriptionsHierarchyEntry sample group description.

The grouping_type_paramater for EssentialDescriptionsHierarchyEntry sample group description is not defined, and its value is set to 0.

The syntax and semantics of EssentialDescriptionsHierarchyEntry may be defined as follows:

```
class EssentialDescriptionsHierarchyEntry ( )
extends SampleGroupDescriptionEntry ('esgh')
{
    bit(8) num_groupings;
    unsigned int(32) sample_group_description_type[num_groupings];
}
where
``` num_groupings indicates the number of essential sample group description types listed in the entry and sample_group_description_type indicates the four-character code of the essential sample group description applying to the associated samples. These types are listed in order, i.e. any potential sample processing described by a sample group of type sample_group_description_type[i] is applied before any potential sample processing described by a sample group of type sample_group_description_type[i+1]. The reserved value 'stsd' indicates the position of the decoding process in the transformation chain.

If 'stsd' is absent from the list of sample_group_description_type, all listed essential sample group are applied to samples after decoding.

As an example, a sample being encrypted before being encoded may be signalled through an essential sample group of grouping_type 'vcne'. If the same sample also needs to have a post-processing filter applied to it after being decoded, this post-processing may be signalled through an essential sample group of grouping_type 'ppfi'. According to this example, an EssentialDescriptionsHierarchyEntry is defined. It lists the transformations in following order ['vcne', 'stsd', 'ppfi'] to signal the order of nested transformations. From this signalling and following the order of transformations, a parser or reader can determine that the sample has to be decrypted before being decoded by a decoder identified by the sample entry, and has to be processed by a post-processing filter before being rendered or displayed.

In a variant, instead of using the reserved value 'stsd' in the sample_group_description_type[ ] array of EssentialDescriptionsHierarchyEntry to differentiate pre-decoding and post-decoding essential sample groups, the nature of the essential sample group (pre or post decoding) is determined from the definition associated with the four-character code (4CC) stored in the grouping_type parameter of the essential SampleGroupDescriptionBox and identifying the transformation or the descriptive property. For instance, it can be defined that 'clap' actually identifies a crop/clean aperture transformation and this transformation is a post-decoding transformation. As another example, it can be defined that 'cenc' actually identifies a common encryption method (e.g. AES-CTR mode full sample and video NAL Subsample encryption) and this transformation is a pre-decoding transformation.

Therefore, sample_group_description_type is defined as follows: it indicates the four-character code of the essential sample group description applying to the associated samples. These types are listed in order, i.e. any potential sample processing described by a sample group of type sample_group_description_type[i] is applied before any potential sample processing described by a sample group of type sample_group_description_type[i+1]. All pre-decoding essential sample group descriptions are listed first, followed by all the post-decoding essential sample group descriptions in order.

In another variant, the nature of the essential sample group (pre or post decoding) is explicitly signalled using a parameter in the essential SampleGroupDescriptionBox. For instance, this parameter may correspond to the 'flags' parameter in the box header of an essential SampleGroupDescriptionBox. A new flags value pre-decoding_group_description can be defined, e.g. value 4 (0x100). When set to 1, this flag indicates that the essential sample group is a pre-decoding essential sample group. Otherwise, when set to 0, this flag indicates that the essential sample group is a post-decoding essential sample group.

As for the previous variant, all pre-decoding essential sample group descriptions are therefore listed first in the sample_group_description_type[ ] array of EssentialDescriptionsHierarchyEntry, followed by all the post-decoding essential sample group descriptions in order.

In another variant, it is possible to differentiate three different natures of essential sample group: pre-decoding transformation, post-decoding transformation and descriptive properties. The nature of the essential sample group can be signalled using a method similar to one of any variants above (i.e. as part of the semantics of the four-character code identifying the type of sample group, or by using a parameter in the essential SampleGroupDescriptionBox). In case of using the 'flags' parameter in the box header of an essential SampleGroupDescriptionBox to signal the nature of the essential sample group, following 2-bit flags values may be defined (corresponding to bit 3 and 4 of the 'flags' parameter):

descriptive_group_description with value 0 (0x00), when set, this 2-bit flag value indicates that the essential sample group is a descriptive essential sample group, pre-decoding_group_description with value 1 (0x01), when set, this 2-bit flag value indicates that the essential sample group is a pre-decoding essential sample group, post-decoding_group_description with value 2 (0x10), when set, this 2-bit flag value indicates that the essential sample group is a post-decoding essential sample group, and value 3 (0x11) is reserved.

According to this variant, all pre-decoding essential sample group descriptions are therefore listed first in the sample_group_description_type[ ] array of EssentialDescriptionsHierarchyEntry, followed by all the descriptive essential sample group, followed by all post-decoding essential sample group descriptions in order.

In an alternative, all pre-decoding essential sample group descriptions are listed first in the sample_group_description_type[ ] array of EssentialDescriptionsHierarchyEntry, followed by all the post-decoding essential sample group, followed by all descriptive essential sample group descriptions in order.

The essentiality of sample properties defined in a file by an essential sample group and the order of these essential sample group should be advertised through a MIME sub-parameter. This informs parsers or readers about additional expected requirements to support the file. Essential sample groups to be applied before decoding are listed in the 'codec' sub parameter in the order they apply (as indicated by the 'esgh' sample group description) to ensure maximum compatibility with existing practices. Other essential sample groups are listed in a new sub-parameter, for example called "essential", that takes as values a comma-separated list of four-character codes that correspond to grouping_types of essential sample groups to be applied after decoding.

In other words, when essential sample group descriptions are present for a track:

the four-character code of essential sample group descriptions applying prior to the decoding process are listed, in the order they apply, in the 'codecs' sub parameter, prior to the codec configuration. A 'dot' is used to separate each essential sample group descriptions the four-character code of essential sample group descriptions applying after the decoding process may be listed, in the order they apply, in the 'essential' sub-parameter. Multiple values of essential sample group descriptions are dot-separated.

As an example, a sample being encrypted before encoding may be signalled through an essential sample group of grouping_type 'vcne'. If the same sample also needs to have a post-processing filter applied to it after being decoded, this post-processing may be signalled through an essential sample group of grouping_type 'ppfi'. According and to this example as described above, an EssentialDescriptionsHierarchyEntry is defined and lists the transformations in following order ['vcne', 'stsd', 'ppfi'] to signal the order of nested transformations.

Therefore, the 'codecs' mime type sub-parameter may be:

--- codecs=vcne.hvc1.1. 6.L186.80

---

This signals to a reader that samples have been encrypted and have to be decrypted according to the transformation identified by the 4CC 'vcne' before being decoded by a decoder conformant with the codec and profile tier level identified by 'hvc1.1.6.L186.80'

And the 'essential' mime type sub-parameter is:

--- essential=ppfi

---

This signal to a reader that a post-processing filter identified by the essential sample group 'ppfi' should be applied to the samples after decoding and before rendering In an alternative, The EssentialDescriptionsHierarchyEntry sample group description indicates the processing order of the essential and non-essential sample group descriptions applying to a given sample. Non-essential sample group descriptions can be either post-decoding transformation or descriptive information.

In a variant, rather than describing the processing order of sample groups in an EssentialDescriptionsHierarchyEntry sample group description, the EssentialDescriptionsHierarchyEntry can be declared as a SampleGroupDescriptionsHierarchyBox defined in the SampleTableBox or the TrackFragmentBox as follows:

---

```
class SampleGroupDescriptionsHierarchyBox ( )
extends FullBox ('esgh', version, flags = 0)
{
  bit(8) num_groupings;
  unsigned int(32) sample_group_description_type[num_groupings];
}
```

--- with the same syntax and semantics as EssentialDescriptionsHierarchyEntry.

In such a case, the declaration of a processing order of sample groups in a SampleGroupDescriptionsHierarchyBox of a TrackFragmentBox replaces the processing order declared in a SampleGroupDescriptionsHierarchyBox in any preceding TrackFragmentBox with same trackID and in the preceding SampleTableBox in TrackBox with same trackID.

According to some embodiments of the invention and as an alternative to embodiments illustrated in FIG. 3 and FIG. 4, codec switching in a track and dynamic sample descriptions or sample entries in a track are declared using essential sample groups rather than defining a sample description box ('stsd') in the track fragment box ('traf').

A new essential sample group description with grouping_type 'stsd' is defined, whose entries consists in sample description child boxes (i.e. SampleEntry boxes providing a description of samples for a given coding format), and assigning samples to the right entry using a SampleToGroupBox with same grouping_type or an entry by default using the default_group_description_index parameter of the essential SampleGroupDescriptionBox.

According to a first variant, the sample description box 'stsd' in the SampleTableBox of the track is either an empty box (no sample entry box is defined inside), or no sample description box 'stsd' is defined in the SampleTableBox of the track. All sample entries are declared in an essential sample group description box with grouping_type 'stsd' that may be defined either in the SampleTableBox of the track (i.e. trackBox in MovieBox) or in any movie fragment or both.

In order to allow a parser retrieving the definition of the sample entry associated with a sample, the semantics of sample_description_index in the track fragment header 'tfhd' and of default_sample_description_index in the TrackExtendsBox 'trex' may therefore be re-defined as follows:

value 0 means that the mapping from sample to sample description index is done through a SampleToGroupBox of grouping type 'stsd', value above 0 and less than or equal to 0x10000 indicates the index of the 'stsd' entry in the sample group description of grouping type 'stsd' defined in the track box, 1 being the first entry, and value strictly greater than 0x10000 gives the index (value—0x10000) in the sample group description 'sgpd' of grouping type 'stsd' defined in the track fragment 'traf', 1 being the first entry.

According to a second variant, sample entries may be declared in the sample description box 'stsd' in the SampleTableBox of the track and/or in an essential sample group description box with grouping_type 'stsd' that may be defined in any movie fragment. No essential sample group description box with grouping_type 'stsd' can be defined in the SampleTableBox of the track.

In order to allow a parser retrieving the definition of the sample entry associated with a sample, the semantics of sample_description_index in the track fragment header 'tfhd' and of default_sample_description_index in the TrackExtendsBox 'trex' may therefore be re-defined as follows:

value 0 means that the mapping from sample to sample description index is done through a SampleToGroupBox of grouping type 'stsd', value above 0 and less than or equal to 0x10000 indicates the index of the 'stsd' entry in the track defined in the MovieBox, 1 being the first entry, and value strictly greater than 0x10000 gives the index (value—0x10000) in the sample group description 'sgpd' of grouping type 'stsd' defined in the track fragment 'traf', 1 being the first entry.

According to a third variant, sample entries may be declared either in the sample description box 'stsd' in the SampleTableBox of the track, or in an essential sample group description box with grouping_type 'stsd' or both. And the essential sample group description box with grouping_type 'stsd' may be defined in the SampleTableBox of the track or in any movie fragment or both.

In order to allow a parser retrieving the definition of the sample entry associated with a sample, the semantics of sample_description_index in the track fragment header 'tfhd' and of default_sample_description_index in the TrackExtendsBox 'trex' may therefore be re-defined as follows:

value 0 means that the mapping from sample to sample description index is done through a SampleToGroup-Box of grouping type 'stsd', value above 0 and less than or equal to 0x10000 indicates the index of the 'stsd' entry in the track defined in the MovieBox, 1 being the first entry, value strictly greater than 0x10000 and less than or equal to 0x20000 indicates the index (value—0x10000) of the 'stsd' entry in the sample group description of grouping type 'stsd' defined in the track box, 1 being the first entry, and value strictly greater than 0x20000 gives the index (value—0x20000) in the sample group description 'sgpd' of grouping type 'stsd' defined in the track fragment 'traf', 1 being the first entry.

Therefore, according to these embodiments, the invention provides a method for encapsulating media data units, the method being carried out by a server and comprising identifying, according to a parameter independent from the encapsulation, a set of media data units, obtaining an indication of a transformation to be applied to each media data unit of the set of media data units before or after parsing or decoding the encapsulated media data units, and encapsulating the media data units in one or more media files, the media data units of the set of media data units being grouped in a group associated with the indication of the transformation.

The media data units may be samples.

According to some embodiments, the one or more media files further comprises an additional indication signalling to a client that the group of media data units is to be parsed, decoded, or rendered only if the client has knowledge about the indication of the transformation.

Still according to some embodiments, the steps of identifying a set of media data units, of obtaining an indication of a transformation, and of encapsulating the media data units are repeated, the method further comprising obtaining an order of applying the transformations and further comprising encapsulating an item of information representing the order.

Still according to some embodiments, the one or more transformations and the order may be provided as a property of the one or more media file.

Still according to the previous embodiments, the invention provides a method for parsing encapsulated media data units, the method being carried out by a client and comprising obtaining an indication of a transformation to be applied to each media data unit of a group of media data units before or after parsing or decoding the encapsulated media data units, obtaining encapsulated media data units of the group of media data units;

parsing the obtained encapsulated media data units from one or more media files while applying the transformation to each media data unit of the obtained encapsulated media data units before or after parsing or decoding the obtained encapsulated media data units depending on the obtained indication.

Again, the media data units may be samples.

According to some embodiments, the one or more media files further comprises an additional indication signalling to a client that encapsulated media data units of the group of media data units are to be parsed, decoded, or rendered only if the client has knowledge about the indication of the transformation.

Still according to some embodiments, the steps of obtaining an indication of a transformation, of obtaining encapsulated media data units, of parsing the obtained encapsulated media data units, and of applying a transformation are repeated, the method further comprising obtaining an order of applying the transformations from the one or more media files, the transformations being applied according to the obtained order.

Still according to some embodiments, the one or more transformations and the order are obtained from properties of the one or more media file.

The benefit of using essential sample group descriptions for sample entries is that it allows decorrelating track fragment from sample description index (given in the track fragment header), avoiding to create new track fragments when sample description changes.

More generally, signaling an essential feature may be useful to signal to a reader other properties of a presentation applying to various sets of samples (track, group of tracks, group of entities) that are essential to be supported (parsed and understood) to render or process the sets of samples or the whole presentation.

According to a particular embodiment, tracks may be grouped together to form one or more groups of tracks where each group shares a particular characteristic or the tracks within a group have a particular relationship signalled by a specific 4CC value in a track_group_type parameter. A group of tracks is declared by defining a TrackGroupType-Box box with the same track_group_type parameter and same group identifier track_group_id inside each TrackBox ('trak') box of tracks belonging to the group of tracks.

An essential flag value (e.g. value=0x2) may be defined in the flags of the TrackGroup TypeBox box to signal to a reader that the semantics of a particular group of tracks with a particular value of track_group_type parameter and track_group_id should be supported (parsed and understood) to render or process the sets of samples formed by this group of tracks. If the essential flag is set for a group of tracks and the semantics of this group of tracks is not understood by the parser, then the parser should not render or process any one of the tracks belonging to this group of tracks.

When this essential flag is set in a TrackGroupTypeBox box with a particular track_group_type parameter value for a track, it should be also set in all TrackGroupTypeBox boxes with same particular track_group_type parameter value for all other tracks belonging to the same group of tracks.

For the sake of illustration, track groups of type 'ster' signalling tracks forming a stereo pair suitable for playback on a stereoscopic display or track groups of type '2dsr' signalling tracks with two dimensional spatial relationships (e.g. corresponding to spatial parts of a video source) are examples of track groups that may benefit from this essential signalling.

In a variant, if the essential flag is set for a group of tracks in a presentation and the semantics of this group of tracks signaled by the track_group_type parameter is not understood by the parser, then the parser should not render or process the whole presentation.

In another variant, an essential group of tracks may be declared by defining a specific group of tracks with a specific track_group_type, e.g. equal to 'etial', to signal to a reader that all tracks belonging to this group of tracks are essentials and should be supported (parsed and understood) to be render or process together, i.e. all sample entries defined in SampleDescriptionBox ('stsd') box of each TrackBox ('trak') of each track belonging to the group of tracks should be supported (parsed and understood) by the reader.

According to another embodiment, entities (i.e. tracks and/or items) may be grouped together to form one or more groups of entities where each group shares a particular characteristic or the entities within a group have a particular relationship signalled by a specific 4CC value in a grouping_type parameter. On the contrary to tracks that represent timed sequences of samples initially described by a MovieBox ('moov') box and a set of TrackBox ('trak') boxes, items represents untimed media data described by a MetaBox ('meta') box and its hierarchy of boxes (e.g. comprising ItemInfoBox ('iinf') box, ItemLocationBox ('iloc') box, etc.).

A group of entities is declared by defining an EntityToGroupBox box with a particular grouping_type parameter, a group identifier group_id and a list of entities identifiers (track_IDs or item_IDs) inside a MetaBox ('meta') box. This MetaBox ('meta') box may be located at various levels, e.g. at file level (i.e. same level as the MovieBox ('moov') box), at track level (i.e. within a TrackBox ('trak') box), at movie fragment level (i.e. within a MovieFragmentBox ('moof') box), or at track fragment level (i.e. within a TrackFragmentBox ('traf') box).

An essential flag value (e.g. value=0x1) may be defined in the flags of the EntityToGroupBox box to signal to a reader that the semantics of the group of entities declared by this EntityToGroupBox box with a particular value of grouping-_type parameter and group_id should be supported (parsed and understood) to render or process the sets of samples and items formed by this group of entities. If the essential flag is set for a group of entities and the semantics of this group of entities is not understood by the parser, then the parser should not render or process any one of the tracks or items belonging to this group of entities.

In a variant, if the essential flag is set for a group of entities in a presentation and the semantics of this group of entities signaled by the grouping_type parameter is not understood by the parser, then the parser should not render or process the whole presentation.

In another variant, an essential group of entities may be declared by defining a specific group of entities with a specific grouping_type, e.g. equal to 'etial', to signal to the reader that all tracks and/or items belonging to this group of entities are essentials and should be supported (parsed and understood) to be render or process together, i.e. all sample entries defined in SampleDescriptionBox ('stsd') box of each TrackBox ('trak') box of each track belonging to the group of entities and all items defined in an ItemInfoBox ('iinf') box and belonging to the group of entities should be supported (parsed and understood) by the reader.

More generally, signaling essential features may be useful to signal to the reader data structures or boxes that are essential to be supported (parsed and understood) to render or process a presentation or part of a presentation.

According to another embodiment, a track may be associated with an edit list providing an explicit timeline map for the track. Each entry of an edit list may define part of the track timeline: by mapping part of the composition timeline, or by indicating 'empty' time (portions of the presentation timeline that map to no media, an 'empty' edit), or by defining a 'dwell', where a single time-point in the media is held for a period.

An essential flag value (e.g. value=0x2) may be defined in the flags of the EditListBox ('elst') box to signal to the reader that the explicit timeline map defined by this edit list should be supported (parsed and applied) to render or process the associated track and should not be ignored by the parser.

Still according to another embodiment, an essential flag value (e.g. value=0x800000) may be defined in the flags of the TrackHeaderBox ('tkhd') box of a TrackBox ('trak') box to signal to a reader that the corresponding track should be supported (parsed and understood) to render or process the presentation, i.e. all sample entries defined in SampleDescriptionBox ('stsd') box of the TrackBox ('trak') of this track should be supported (parsed and understood) by the reader to process the presentation.

According to another embodiment, an essential flag value (e.g. value=0x1) may be defined in the flags of a ItemInfoEntry ('infe') box in an ItemInfoBox ('iinf') box to signal to a reader that the corresponding item and all its essential item properties should be supported (parsed and understood) to render or process the presentation.

More generally, an essential flag value may be defined in any full boxes (i.e. boxes having a flag parameter) of ISOBMFF and its derived specifications to signal to a reader that this box should be supported (parser and understood) by the reader and should not be ignored if not supported.

Figure 7:
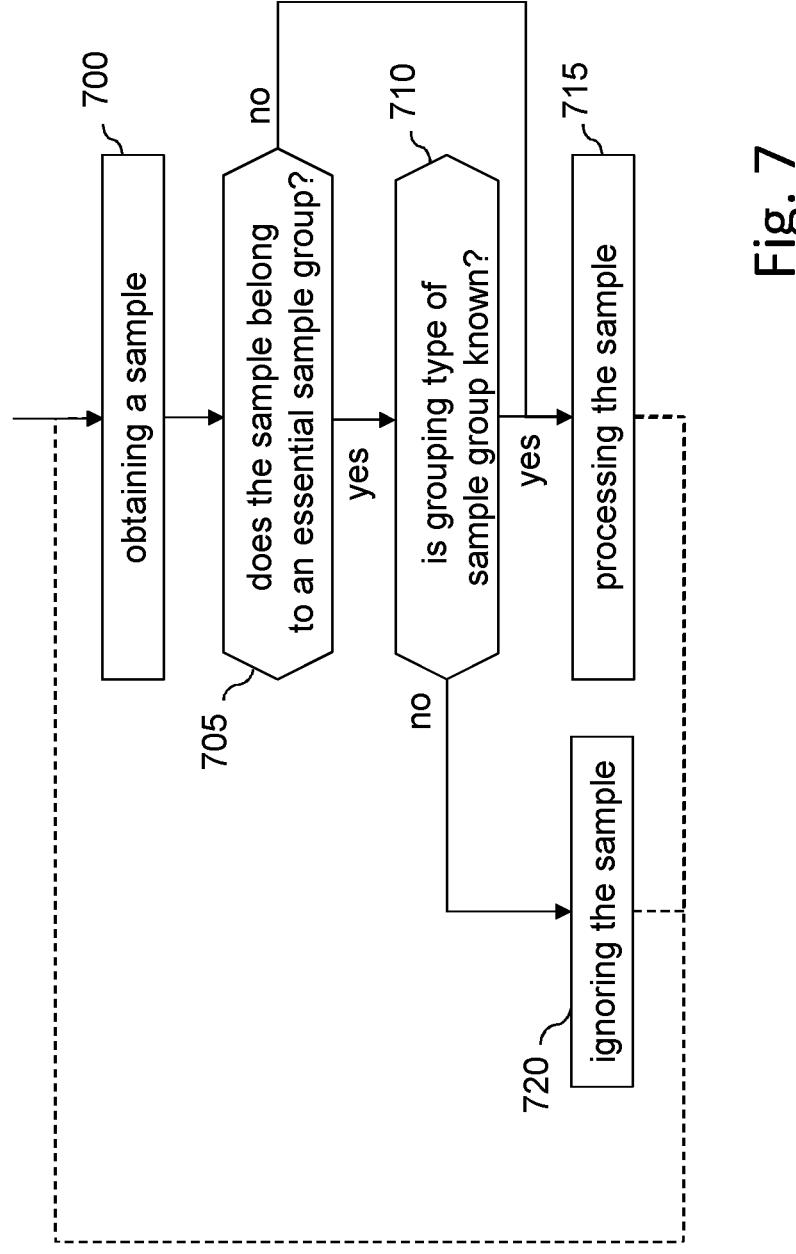
FIG. 7 is a block diagram illustrating an example of steps carried out by a client or reader to obtain data according to some embodiments of the invention.

FIG. 7 is a block diagram illustrating an example of steps carried out by a client or reader to obtain data according to some embodiments of the invention.

In a variant to the above embodiments, instead of forbidding a reader to decode any track for which unrecognized sample group descriptions marked as essential are present, the following steps illustrate an alternative where only samples associated with a property of an essential sample group may be ignored by a reader.

At step 700, a reader gets a sample by parsing an ISOBMFF file or segment file.

Next, at step 705, the reader checks whether the sample belongs to a sample group signalled as an essential sample group according to some of the embodiments described above. If the sample group is essential, the reader checks whether the grouping type of the essential sample group is known (step 710).

If the grouping type of the essential sample group is known, the sample (and other samples in the group) can be processed (step 715), otherwise it is ignored (step 720).

For example, in particular use cases, supplemental enhancement information (SEI) usually carried in encoded video bit-stream (e.g. for transmitting media data of the High Dynamic Range (HDR), Virtual Reality (VR), or film grain type) may be conveyed in sample group descriptions marked as essential.

It is recalled that media bit-streams may come with additional information that can be used to assist players in media file processing, for example for decoding, displaying, or for other purposes. For example, video bit-streams may come with SEI messages, defined as standard specification (e.g. ISO/IEC 23002-7). This additional information may be used by applications and may be specified by other standard or guidelines or interoperability point in some consortia (e.g. ATSC, DVB, ARIB, DVB, etc) using MPEG specifications like compression or encapsulation or description specifications. For example, some DVB specifications mandate Alternative Transfer Characteristics SEI for HDR applications. Some other SCTE specifications mandate additional information allowing closed caption data with video streams. With the proliferation of such additional information and the more and more complex media streams, some SEI messages or additional information may become mandatory or required for rendering a media presentation.

According to particular embodiments, such SEI information is provided as a VisualSampleGroupEntry and associated with a group of samples and this sample group is signalled as essential. For example, grouping type values may be defined and reserved, one per important or mandatory SEI, for example one value for the Alternative Transfer Characteristics SEIs for HDR, one value for the Picture Timing SEIs, one value for the Frame packing SEIs for stereo applications, and one value for the Film Grain characteristics to improve decoded images. The payload of these sample group entries would correspond to the payload of the additional information. For example, for SEI messages, the NAL units corresponding to a SEI message would be provided in a VisualSampleGroupEntry in a SampleGroupDescriptionBox ('sgpd') box with the grouping type indicating the type of SEIs. Using essential sample groups and the MIME sub-parameters, applications are then aware that some additional features to the codec should be supported to handle the media file. When a given group of samples shares the same additional information, a single VisualSampleGroupEntry may be used to provide all NAL units corresponding to these SEIs at once. This allows content creators to indicate SEI messages that are expected to be processed by players as essential. This is especially relevant for the SEI messages that are not listed in the sample description (that may be just be present as a NAL units array in the decoder configuration record within a sample entry). Having SEI messages rather in sample groups than in the NAL units arrays of a decoder configuration further allows easy handling of the SEI persistence, for example when applying to some samples and not systematically for a whole sequence. In addition, having SEIs in sample groups allows a content creator to indicate at the encapsulation's side the important or required ones that players, clients, or applications are expected to support to render the media file. Moreover, when exposed in a MIME sub-parameter, parsers or applications can decide whether they can support the media presentation or not.

Figure 8:
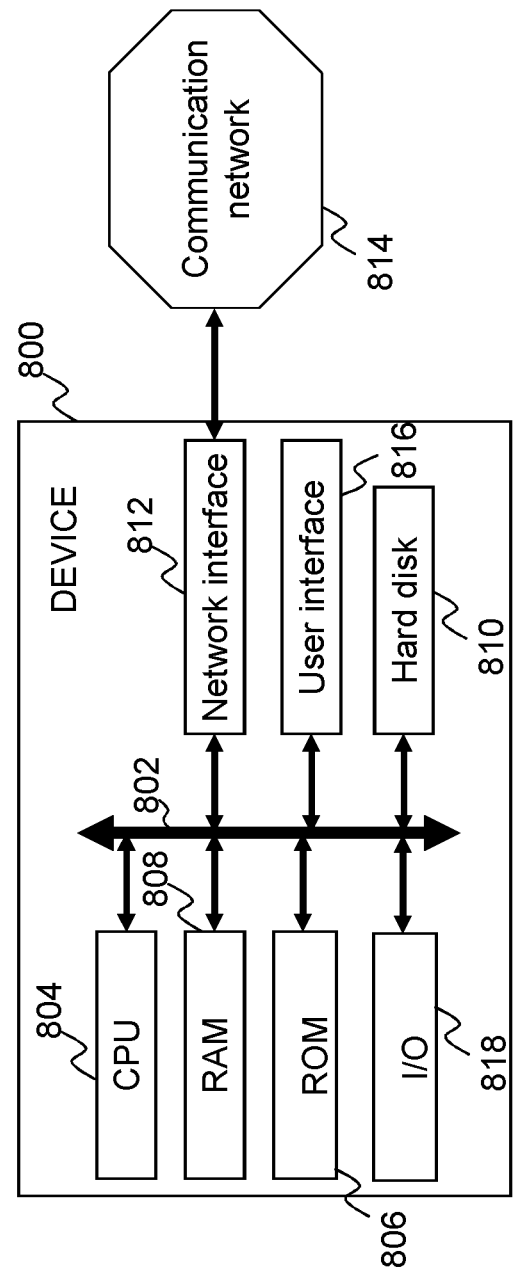
FIG. 8 schematically illustrates a processing device configured to implement at least one embodiment of the present invention.

FIG. 8 is a schematic block diagram of a computing device 800 for implementation of one or more embodiments of the invention. The computing device 800 may be a device such as a micro-computer, a workstation, or a light portable device. The computing device 800 comprises a communication bus 802 connected to:

a central processing unit (CPU) 804, such as a microprocessor;

a random access memory (RAM) 808 for storing the executable code of the method of embodiments of the invention as well as the registers adapted to record variables and parameters necessary for implementing the method for encapsulating, indexing, de-encapsulating, and/or accessing data, the memory capacity thereof can be expanded by an optional RAM connected to an expansion port for example;

a read only memory (ROM) 806 for storing computer programs for implementing embodiments of the invention;

a network interface 812 that is, in turn, typically connected to a communication network 814 over which digital data to be processed are transmitted or received. The network interface 812 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 804;

a user interface (UI) 816 for receiving inputs from a user or to display information to a user;

a hard disk (HD) 810; and/or an I/O module 818 for receiving/sending data from/to external devices such as a video source or display.

The executable code may be stored either in read only memory 806, on the hard disk 810 or on a removable digital medium for example such as a disk. According to a variant, the executable code of the programs can be received by means of a communication network, via the network interface 812, in order to be stored in one of the storage means of the communication device 800, such as the hard disk 810, before being executed.

The central processing unit 804 is adapted to control and direct the execution of the instructions or portions of software code of the program or programs according to embodiments of the invention, which instructions are stored in one of the aforementioned storage means. After powering on, the CPU 804 is capable of executing instructions from main RAM memory 808 relating to a software application after those instructions have been loaded from the program ROM 806 or the hard-disc (HD) 810 for example. Such a software application, when executed by the CPU 804, causes the steps of the flowcharts shown in the previous figures to be performed.

In this embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a person skilled in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for encapsulating media data comprising a plurality of samples, the method being carried out by a file generating device and comprising:

generating at least one track including the plurality of samples;

generating a first sample group description describing a processing order of 1) at least one transformation and/or 2) at least one second sample group description, the at least one transformation and/or the at least one second sample group description being applied before or after processing or decoding at least one sample of the at least one track, the first sample group description being associated with the at least one track; and encapsulating the at least one track and the first sample group description in a media file, wherein the media file comprises an indication signalling to a file reading device that the at least one track is not to be processed in a case where the file reading device does not recognize the second sample group description.

2. The method of claim 1, wherein the processing order is described as an ordered list of values comprising a type value of the at least one transformation and/or second sample group description.

3. The method of claim 2, wherein the ordered list further comprises a value indicating the position of a decoding process in a transformation chain comprising the at least one transformation and/or the at least one second sample group description.

4. The method of claim 3, wherein the ordered list further comprises a value indicating the position of a content protection removal in the transformation chain.

5. The method of claim 2, wherein when the ordered list does not comprise a value indicating the position of a decoding process, all of the at least one transformation and/or at least one second sample group description apply to decoded samples.

6. The method of claim 2, wherein each value in the ordered list of values is a four-character code.

7. The method of claim 1, wherein the first sample group description is associated with an indication signalling to the file reading device that the at least one track is not to be processed in a case where the file reading device does not recognize the first sample group description.

8. The method of claim 1, wherein the media file is described with a MIME type having a parameter comprising a type value of at least one of the transformations and/or second sample group descriptions.

9. A method for processing encapsulated media data comprising at least one track including a plurality of samples, the method being carried out by a file reading device and comprising:

obtaining the at least one track to be processed;

obtaining, from the encapsulated media data, a first sample group description describing a processing order of 1) at least one transformation and/or 2) at least one second sample group description, the at least one transformation and/or the at least one second sample group description being applied before or after processing or decoding at least one sample of the at least one track, the first sample group description being associated with the at least one track;

obtaining, from the encapsulated media data, the first sample group description;

determining that the encapsulated media data comprises an indication signalling that the at least one track is to be processed in a case where the file reading device recognizes the second sample group description, and in a case where the file reading device does not recognize the second sample group description, ignoring the at least one track when processing the encapsulated media data.

10. The method of claim 9, wherein the processing order is described as an ordered list of values comprising a type value of the at least one transformation and/or second sample group description.

11. The method of claim 10, wherein the ordered list further comprises a value indicating the position of a decoding process in a transformation chain comprising the at least one transformation and/or the at least one second sample group description.

12. The method of claim 11, wherein the ordered list further comprises a value indicating the position of a content protection removal in the transformation chain.

13. The method of claim 10, wherein when the ordered list does not comprise a value indicating the position of a decoding process, all of the at least one transformation and/or at least one second sample group description apply to decoded samples.

14. The method of claim 9, wherein the first sample group description is associated with an indication signalling to the file reading device that the at least one track is not to be processed in a case where the file reading device does not recognize the first sample group description.

15. The method of claim 9, wherein the media file is described with a MIME type having a parameter comprising a type value of at least one of the transformations and/or second sample group descriptions.

16. A non-transitory computer-readable storage medium storing instructions of a computer program for implementing the method according to claim 1.

17. A file generating device comprising a processing unit configured for carrying out a method for encapsulating media data comprising a plurality of samples, the file generating device comprising:

at least one processor; and at least one memory in communication with the at least one processor, the at least one memory including computer-readable instructions stored thereon that, when executed by the at least one processor, cause the generating device to:

generate at least one track including the plurality of samples;

generate a first sample group description describing a processing order of 1) at least one transformation and/or 2) at least one second sample group description, the at least one transformation and/or the at least one second sample group description being applied before or after processing or decoding at least one sample of the at least one track, the first sample group description being associated with the at least one track; and encapsulate the at least one track and the first sample group description in a media file, wherein the media file comprises an indication signalling to a file reading device that the at least one track is not to be processed in a case where the file reading device does not recognize the second sample group description.

18. A file reading device comprising a processing unit configured for carrying out a method for processing encapsulated media data comprising at least one track including a plurality of samples, the file reading device comprising:

at least one processor; and at least one memory in communication with the at least one processor, the at least one memory including computer-readable instructions stored thereon that, when executed by the at least one processor, cause the file reading device to:

obtain the at least one track to be processed;

obtain, from the encapsulated media data, a first sample group description describing a processing order of 1) at least one transformation and/or 2) at least one second sample group description, the at least one transformation and/or the at least one second sample group description being applied before or after processing or decoding at least one sample of the at least one track, the first sample group description being associated with the at least one track;

obtain, from the encapsulated media data, the first sample group description;

determine that the encapsulated media data comprises an indication signalling that the at least one track is to be processed in a case where the file reading device recognizes the second sample group description, in a case where the file reading device does not recognize the second sample group description, ignoring the at least one track when processing the encapsulated media data.

* * * * *